US010581298B2

United States Patent
Haniya et al.

(10) Patent No.: US 10,581,298 B2
(45) Date of Patent: Mar. 3, 2020

(54) ROBOT ARM APPARATUS AND ACTUATOR

(71) Applicant: KABUSHIKI KAISHA YASKAWA DENKI, Kitakyushu-shi (JP)

(72) Inventors: Kazuhiro Haniya, Kitakyushu (JP); Hidenori Matsuura, Kitakyushu (JP); Takashi Sanada, Kitakyushu (JP); Osamu Harada, Kitakyushu (JP); Shingo Tsutsumi, Kitakyushu (JP); Hiroshi Saito, Kitakyushu (JP); Daisuke Miyazaki, Kitakyushu (JP); Ken Nakamura, Kitakyushu (JP); Hirotaka Morita, Kitakyushu (JP); Tomoharu Gyotoku, Kitakyushu (JP); Kanji Takanishi, Kitakyushu (JP); Takao Sumi, Kitakyushu (JP); Shoji Kurihara, Kitakyushu (JP)

(73) Assignee: KABUSHIKI KAISHA YASKAWA DENKI, Kitakyushu-shi (JP)

(*) Notice: Subject to any disclaimer, the term of this patent is extended or adjusted under 35 U.S.C. 154(b) by 324 days.

(21) Appl. No.: 15/214,458

(22) Filed: Jul. 20, 2016

(65) Prior Publication Data
US 2017/0036293 A1 Feb. 9, 2017

Related U.S. Application Data

(60) Provisional application No. 62/202,191, filed on Aug. 7, 2015.

(51) Int. Cl.
*H02K 7/102* (2006.01)

(52) U.S. Cl.
CPC ........... *H02K 7/1023* (2013.01); *H02K 7/102* (2013.01)

(58) Field of Classification Search
CPC ........ H02K 11/21; H02K 11/30; H02K 11/33; H02K 7/1023; F16D 2125/68
USPC ............... 310/83, 80, 68 R, 68 D, 77; 475/5; 188/171; 192/90
See application file for complete search history.

(56) References Cited

U.S. PATENT DOCUMENTS

| | | | | |
|---|---|---|---|---|
| 4,463,291 A * | 7/1984 | Usry | ................. | G05D 3/18 310/83 |
| 4,678,952 A * | 7/1987 | Peterson | ................. | B25J 9/1025 310/83 |
| 5,027,023 A * | 6/1991 | Koivikko | ................. | H02K 7/116 310/83 |
| 5,155,423 A * | 10/1992 | Karlen | ................. | B25J 9/04 318/568.1 |
| 5,293,107 A * | 3/1994 | Akeel | ................. | B25J 9/08 310/83 |
| 5,327,064 A * | 7/1994 | Arakawa | ................. | H02K 29/08 307/117 |
| 6,258,007 B1 * | 7/2001 | Kristjansson | ................. | H02K 7/116 477/20 |
| 6,310,455 B1 * | 10/2001 | Siraky | ................. | H02K 29/08 310/80 |

(Continued)

*Primary Examiner* — Burton S Mullins
(74) *Attorney, Agent, or Firm* — Mori & Ward, LLP

(57) ABSTRACT

A robot arm apparatus includes a base structure, a first arm, a first actuator, and an assisting device. The first arm is pivotable relative to the base structure about a first pivot axis. The first actuator is configured to pivotally actuate the first arm relative to the base structure. The assisting device is configured to apply an assist rotational force to the first arm to assist the first actuator.

7 Claims, 21 Drawing Sheets

(56) References Cited

U.S. PATENT DOCUMENTS

| | | | | |
|---|---|---|---|---|
| 6,477,918 B2* | 11/2002 | Sakamoto | ............... | F16M 11/18 |
| | | | | 475/149 |
| 6,548,981 B1* | 4/2003 | Ishii | ............... | H02K 11/04 |
| | | | | 318/15 |
| 6,570,282 B1* | 5/2003 | Ito | ............... | F16H 25/2204 |
| | | | | 310/75 R |
| 6,701,803 B1* | 3/2004 | Tamai | ............... | F16H 49/001 |
| | | | | 74/640 |
| 7,354,371 B2* | 4/2008 | Hazama | ............... | F16H 1/32 |
| | | | | 475/149 |
| 7,409,891 B2* | 8/2008 | Takemura | ............... | F16H 49/001 |
| | | | | 74/640 |
| 7,540,571 B2* | 6/2009 | Yamaguchi | ............... | B60T 1/005 |
| | | | | 188/162 |
| 7,752,943 B2* | 7/2010 | Maruyama | ............... | H02K 7/116 |
| | | | | 74/640 |
| 8,291,788 B2* | 10/2012 | Ihrke | ............... | B25J 9/126 |
| | | | | 74/490.05 |
| 8,823,227 B2* | 9/2014 | Bayer | ............... | F16H 25/06 |
| | | | | 310/83 |
| 9,077,228 B2* | 7/2015 | Tanioka | ............... | B25J 17/0241 |
| 9,321,172 B2* | 4/2016 | Johnson | ............... | B25J 9/08 |
| 9,850,996 B2* | 12/2017 | Chuo | ............... | F16H 49/001 |
| 2012/0146438 A1* | 6/2012 | Ide | ............... | H02K 7/1023 |
| | | | | 310/77 |
| 2012/0235606 A1* | 9/2012 | Takeuchi | ............... | H02K 7/1023 |
| | | | | 318/371 |
| 2013/0039730 A1* | 2/2013 | Sueyoshi | ............... | B25J 9/042 |
| | | | | 414/685 |

* cited by examiner

US 10,581,298 B2

ROBOT ARM APPARATUS AND ACTUATOR

CROSS-REFERENCE TO RELATED APPLICATIONS

The present application claims priority to U.S. Provisional Application No. 62/202,191, filed Aug. 7, 2015, the contents of which are incorporated herein by reference in their entirety.

BACKGROUND OF THE INVENTION

Field of the Invention

The present invention relates to a robot arm apparatus and an actuator.

Discussion of the Background

Robot arms have been known in the robotics field.

SUMMARY OF THE INVENTION

According to a first aspect of the present invention, a robot arm apparatus includes a base structure, a first arm, a first actuator, and an assisting device. The first arm is pivotable relative to the base structure about a first pivot axis. The first actuator is configured to pivotally actuate the first arm relative to the base structure. The assisting device is configured to apply an assist rotational force to the first arm to assist the first actuator.

According to a second aspect of the present invention, a robot arm apparatus includes a welding torch, a robot arm, a supporting device, and a feeding device. The welding torch is configured to weld a work by using a welding wire. The robot arm is configured to move the welding torch. The supporting device is provided separately from the robot arm. The feeding device is configured to feed the welding wire to the welding torch and is mounted to the supporting device.

According to a third aspect of the present invention, an actuator includes a housing, a stator, a rotor, an output shaft, and a speed reducer. The housing includes an internal space. The stator is provided in the internal space. The rotor is rotatable relative to the stator about an input rotational axis and is provided in the internal space. The output shaft is rotatable relative to the stator and the rotor about an output rotational axis. The output shaft is provided in the internal space. The speed reducer is configured to couple the rotor to the output shaft to reduce a rotational speed of the output shaft relative to a rotational speed of the rotor. The speed reducer being provided in the internal space.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
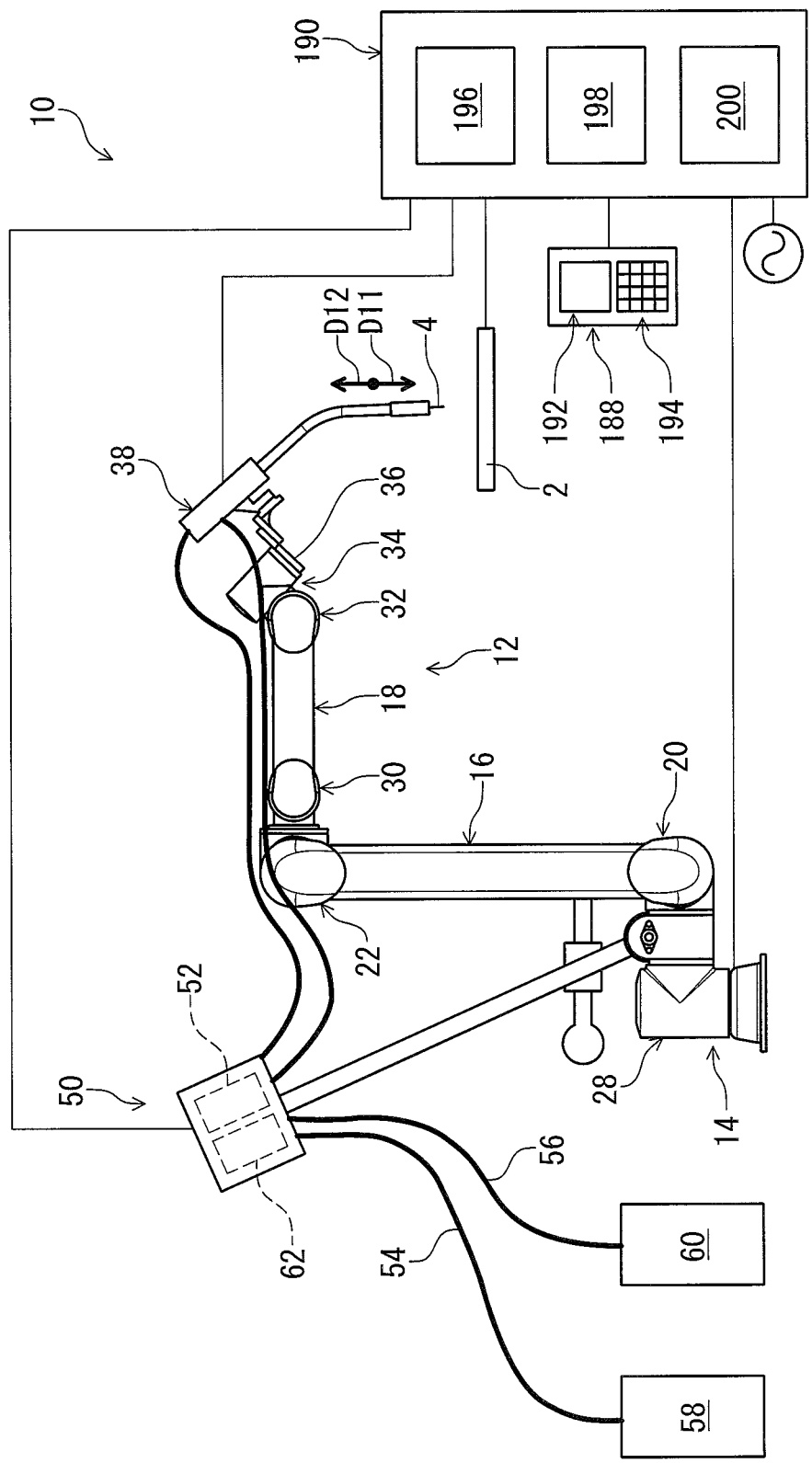
FIG. 1 is a schematic block diagram of a robot arm apparatus in accordance with a first embodiment.

The embodiments will now be described with reference to the accompanying drawings, wherein like reference numerals designate corresponding or identical elements throughout the various drawings.

Referring initially to FIG. 1, a robot arm apparatus 10 in accordance with an embodiment includes a robot arm 12. The robot arm 12 includes a base structure 14, a first arm 16, a second arm 18, a first actuator 20, and a second actuator 22. The first arm 16 and the second arm 18 can be examples of arms of the robot arm.

Figure 2:
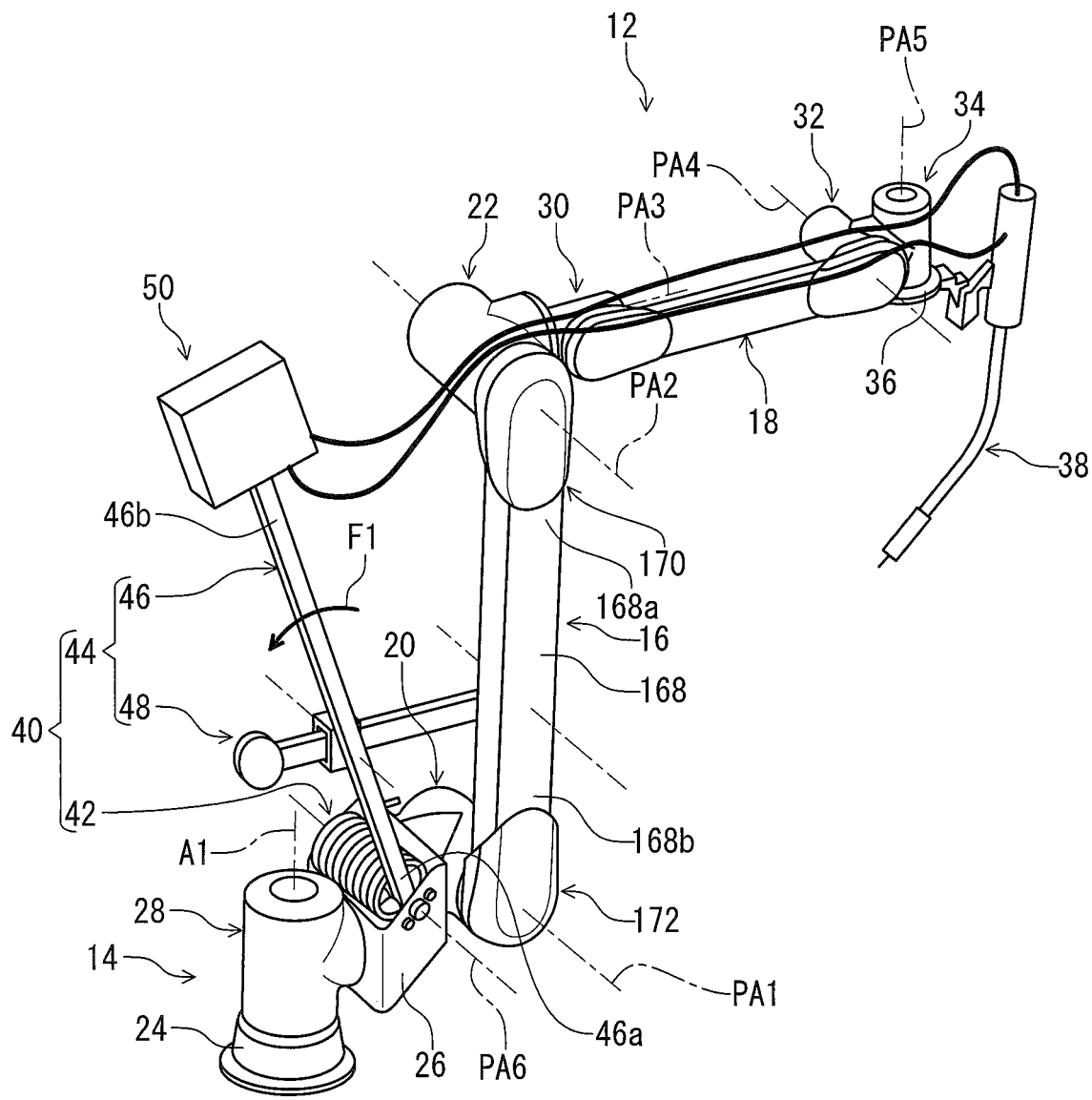
FIG. 2 is a perspective view of a robot arm of the robot arm apparatus.

As seen in FIG. 2, the base structure 14 includes a base 24, a turnable member 26, and a base actuator 28. The turnable member 26 is turnable relative to the base 24 about a base axis A1. The base actuator 28 is configured to rotate the turnable member 26 relative to the base about the base axis A1.

The first arm 16 is pivotable relative to the base structure 14 about a first pivot axis PA1. In this embodiment, the first arm 16 is pivotably coupled to the turnable member 26. The first actuator 20 is configured to pivotally actuate the first arm 16 relative to the base structure 14. The first actuator 20 is secured to the turnable member 26.

The second arm 18 is pivotable relative to the base structure 14 about a second pivot axis PA2. In this embodiment, the second arm 18 is pivotably coupled to the first arm 16. The second actuator 22 is configured to pivotally actuate the second arm 18 relative to the first arm 16.

The robot arm apparatus 10 includes a third actuator 30, a fourth actuator 32, a fifth actuator 34, and an attachment member 36. The base actuator 28 and the first to fifth actuators 20, 22, 30, 32, and 34 can be examples of actuators of the robot arm. The third actuator 30 is configured to rotate the second arm 18 relative to the first arm 16 about a third rotational axis PA3. The third actuator 30 is coupled to the second actuator 22. The second arm 18 is movably coupled to the first arm 16 via the second actuator 22 and the third actuator 30. The fourth actuator 32 is configured to pivotally actuate the fifth actuator 34 relative to the second arm 18 about a fourth pivot axis PA4. The fifth actuator 34 is configured to pivotally actuate the attachment member 36 relative to the fourth actuator 32 about a fifth pivot axis PA5. The fifth actuator 34 is secured to the fourth actuator 32. An end effector is attached to the attachment member 36. In the illustrated embodiment, a welding torch 38 is attached to the attachment member 36 as the end effector. However, other devices can be attached to the attachment member 36. The first arm 16, the second arm 18, the base 24, the turnable member 26, and the attachment member 36 can also be referred to as links 16, 18, 24, 26, and 36.

In this embodiment, the base actuator 28, the first actuator 20, and the second actuator 22 have capacity equal to each other. Thus, it is possible to reduce manufacturing cost of the robot arm apparatus 10. At least one of the base actuator 28, the first actuator 20, and the second actuator 22 can have capacity different from each other. The third actuator 30, the fourth actuator 32, and the fifth actuator 34 have capacity equal to each other. Thus, it is possible to reduce manufacturing cost of the robot arm apparatus 10. At least one of the third actuator 30, the fourth actuator 32, and the fifth actuator 34 can have capacity different from each other. The third actuator 30, the fourth actuator 32, and the fifth actuator 34 have capacity different from the capacity of the base actuator 28, the first actuator 20, and the second actuator 22. The third actuator 30, the fourth actuator 32, and the fifth actuator 34 have capacity smaller than the capacity of the base actuator 28, the first actuator 20, and the second actuator 22. However, at least one of the third actuator 30, the fourth actuator 32, and the fifth actuator 34 can have capacity larger than the capacity of at least one of the base actuator 28, the first actuator 20, and the second actuator 22.

The robot arm apparatus 10 includes an assisting device 40 configured to apply an assist rotational force F1 to the first arm 16 to assist the first actuator 20. The assisting device 40 can also be referred to as a supporting device 40. The supporting device 40 is provided separately from the robot arm 12.

In this embodiment, the assisting device 40 is mounted to the turnable member 26. The assisting device 40 includes a force-generating member 42 and a transmitting structure 44. The force-generating member 42 is configured to generate the assist rotational force F1. The transmitting structure 44 is configured to transmit the assist rotational force F1 from the force-generating member 42 to the first arm 16. In this embodiment, the force-generating member 42 includes a torsion coil spring configured to generate the assist rotational force F1. However, the force-generating member 42 can be other members configured to generate the assist rotational force F1.

The transmitting structure 44 includes a first transmitting member 46 and a second transmitting member 48. The first transmitting member 46 is pivotable relative to the base structure 14 about an assist pivot axis PA6. The assist pivot axis PA6 can also be referred to as a support pivot axis PA6. The first transmitting member 46 is coupled to the force-generating member 42 to receive the assist rotational force F1 from the force-generating member 42. The second transmitting member 48 is configured to couple the first transmitting member 46 to the first arm 16 to transmit the assist rotational force F1 to the first arm 16. In this embodiment, the force-generating member 42 is mounted to the turnable member 26.

The first transmitting member 46 is pivotable relative to the base structure 14 about the support pivot axis PA6 in response to pivotal movement of the first arm 16 relative to the base structure 14. In this embodiment, the support pivot axis PA6 is substantially parallel to the first pivot axis PA1. Specifically, the support pivot axis PA6 is parallel to the first pivot axis PA1. However, the support pivot axis PA6 can be non-parallel to the first pivot axis PA1.

The first transmitting member 46 includes a first end 46a and a second end 46b. The first end 46a is pivotally coupled to the base structure 14. The second end 46b is opposite to the first end 46a. The second end 46b is farther from the assist pivot axis PA6 than the first end 46a.

Figure 3:
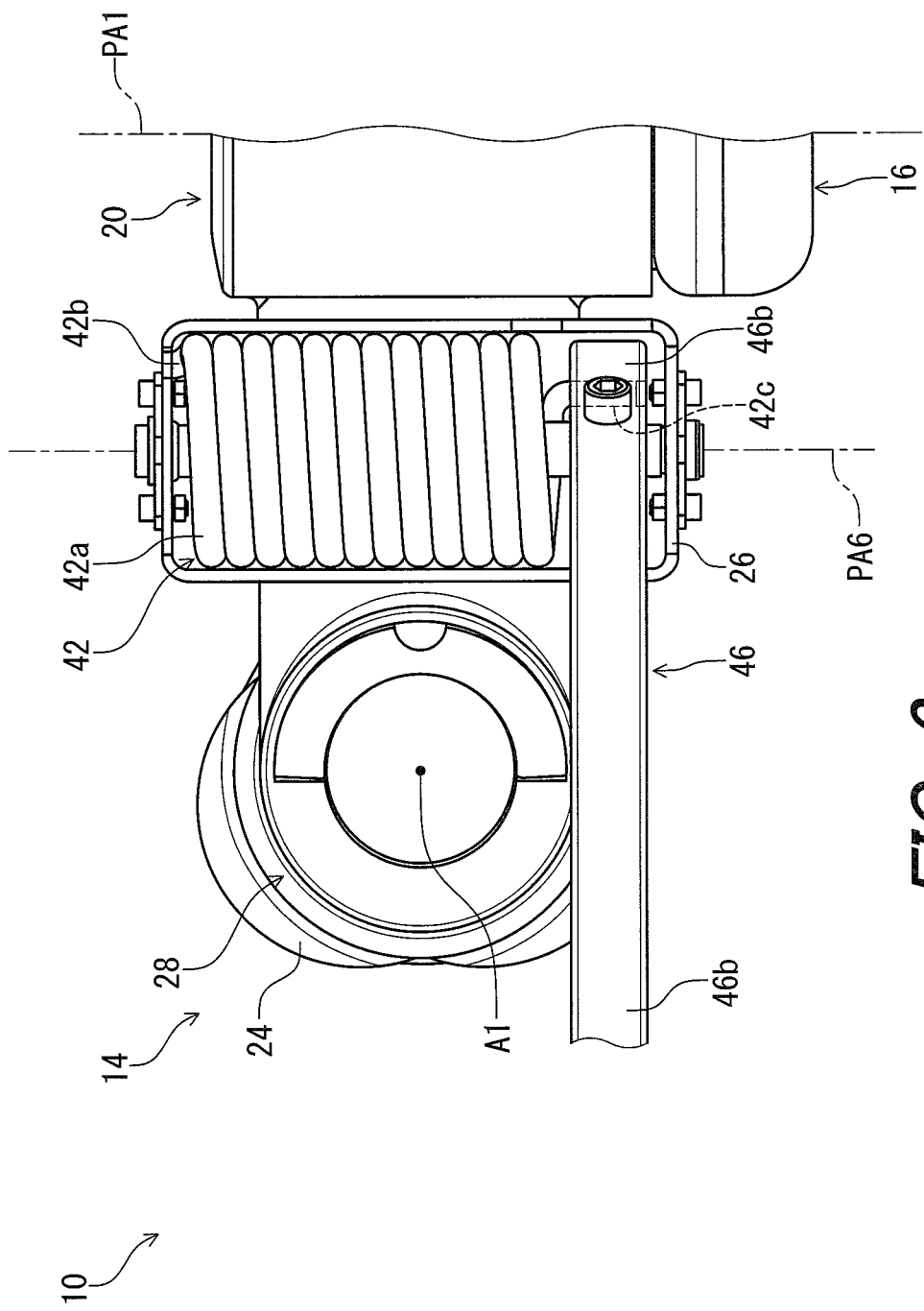
FIG. 3 is a partial top view of the robot arm.
Figure 4:
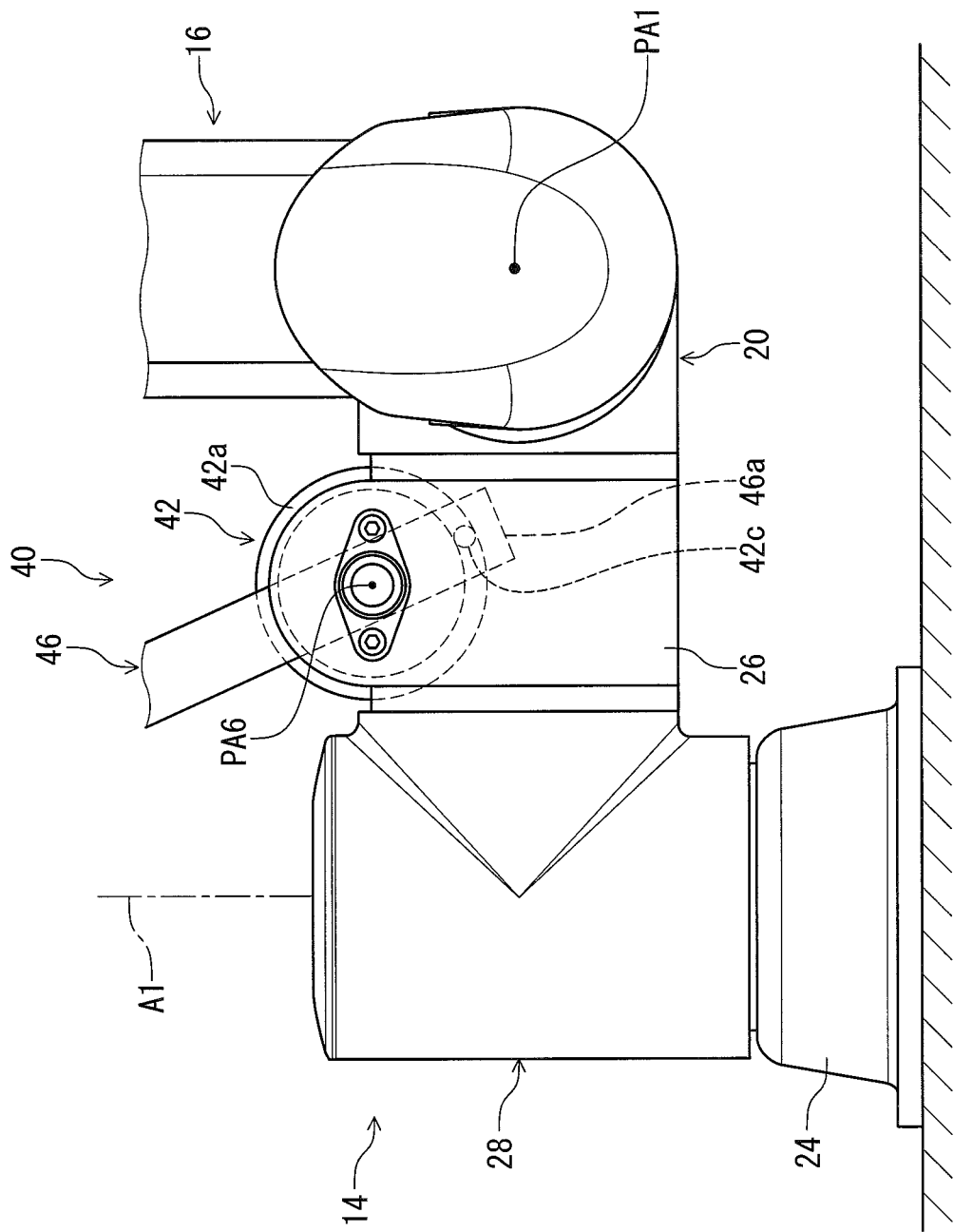
FIG. 4 is a partial elevational view of the robot arm.

As seen in FIGS. 3 and 4, the force-generating member 42 includes a coiled body 42a, a first biasing end 42b (FIG. 3), and a second biasing end 42c. The coiled body 42a generates the assist rotational force F1 (FIG. 2). The first biasing end 42b (FIG. 4) is engaged with the turnable member 26. The second biasing end 42c is engaged with the first transmitting member 46. Specifically, the second biasing end 42c is engaged with the first end 46a of the first transmitting member 46.

Figure 5:
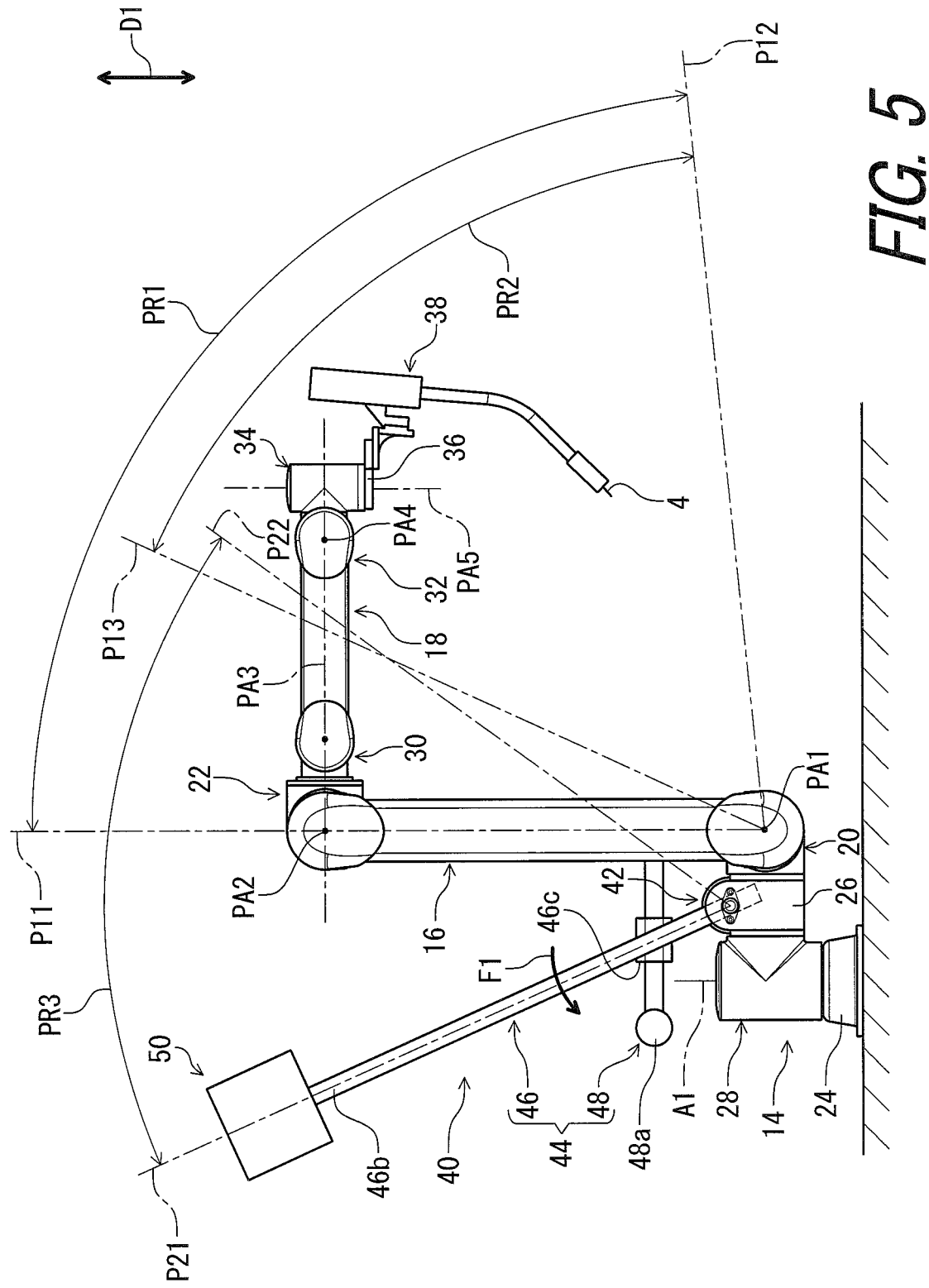
FIG. 5 is an elevational view showing pivotable ranges of the robot arm.

As seen in FIG. 5, the first arm 16 is pivotable relative to the base structure 14 about the first pivot axis PA1 within a first pivotable range PR1. The assisting device 40 is configured to apply the assist rotational force F1 to the first arm 16 while the first arm 16 pivots relative to the base structure 14 about the first pivot axis PA1 within a second pivotable range PR2 smaller than the first pivotable range PR1. The first arm 16 is pivotable relative to the base structure 14 about the first pivot axis PA1 between an initial position P11 and an actuated end position P12 through an intermediate position P13 defined between the initial position P11 and the actuated end position P12. The first pivotable range PR1 is defined between the initial position P11 and the actuated end position. The second pivotable range PR2 is defined between the intermediate position P13 and the actuated end position P12.

In the illustrated embodiment, the first arm 16 extends in a vertical direction D1 in an initial state where the first arm 16 is positioned at the initial position P11. In the initial state of the first arm 16, the second transmitting member 48 is not engaged with the first transmitting member 46. The first arm 16 is inclined relative to the vertical direction D1 in an intermediate state where the first arm 16 is positioned at the intermediate position P13. In the intermediate state of the first arm 16, the second transmitting member 48 comes into engagement with the first transmitting member 46 to transmit the assist rotational force F1 to the first arm 16. The first arm 16 is inclined relative to the vertical direction D1 in an actuated state where the first arm 16 is positioned at the actuated end position P12. In the actuated state of the first arm 16, the second transmitting member 48 is engaged with the first transmitting member 46 to transmit the assist rotational force F1 to the first arm 16. The assist rotational force F1 increases from the intermediate position P13 to the actuated end position P12.

The first transmitting member 46 is pivotable relative to the base structure 14 about the assist pivot axis PA6 between a rest position P21 and an assist end position P22. The first transmitting member 46 is positioned at the rest position P21 by the force-generating member 42 in a rest state where the second transmitting member 48 is not engaged with the first transmitting member 46. The first transmitting member 46 is positioned at the assist end position P22 in an assist state where the assist rotational force F1 is transmitted from the first transmitting member 46 to the first arm 16 via the second transmitting member 48. In this state, the assist rotational force F1 is maximum within an assist pivotable range PR3 defined between the rest position P21 and the assist end position P22.

The first transmitting member 46 pivots relative to the base structure 14 about the assist pivot axis PA6 from the rest position P21 to the assist end position P22 while the first arm 16 pivots relative to the base structure 14 about the first pivot axis PA1 from the intermediate position P13 to the actuated end position P12.

Figure 6:
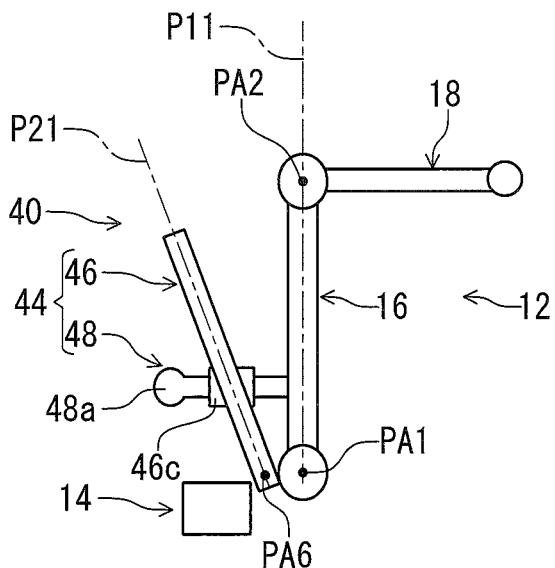
FIG. 6 is a schematic diagram showing pivotal movement of the robot arm (initial position).
Figure 7:
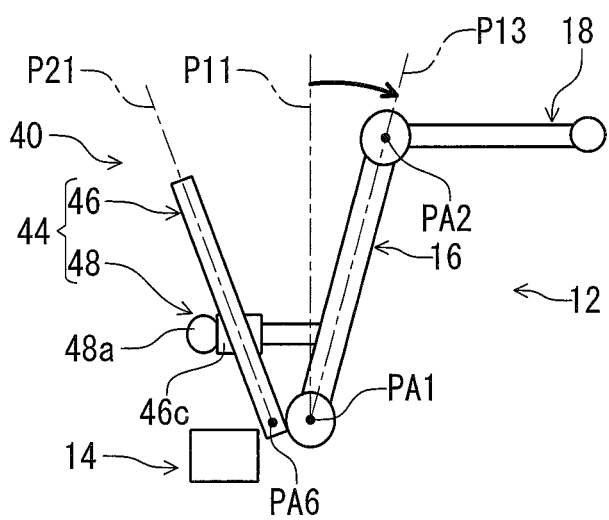
FIG. 7 is a schematic diagram showing pivotal movement of the robot arm (intermediate position).
Figure 8:
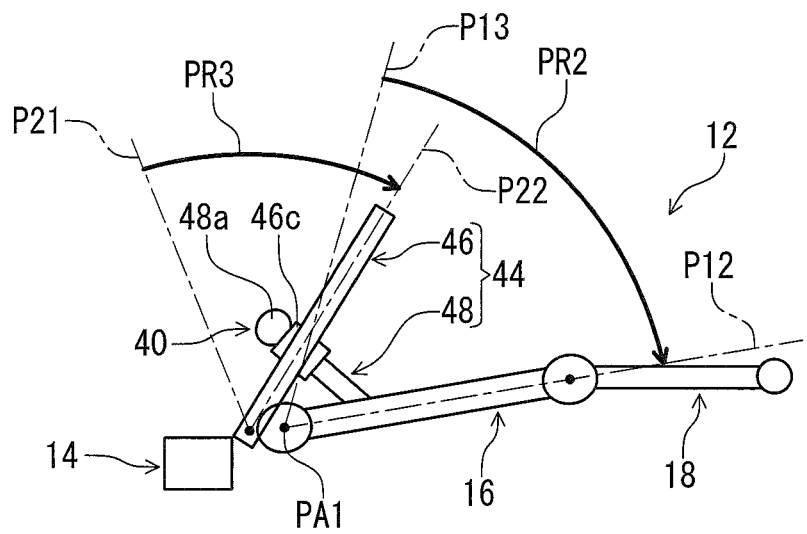
FIG. 8 is a schematic diagram showing pivotal movement of the robot arm (actuated end position).

As seen in FIGS. 6 to 8, the first transmitting member 46 includes a first contact part 46c. The second transmitting member 48 includes a second contact part 48a contactable with the first contact part 46c. As seen in FIG. 6, the second contact part 48a is spaced apart from the first contact part 46c in the rest state of the first transmitting member 46 when the first arm 16 is positioned at the initial position P11. As seen in FIG. 7, the second contact part 48a comes into contact with the first contact part 46c in the rest state of the first transmitting member 46 when the first arm 16 reaches the intermediate position P13. As seen in FIG. 8, the first transmitting member 46 pivots relative to the base structure 14 about the assist pivot axis PA6 from the rest position P21 to the assist end position P22 while the first arm 16 pivots relative to the base structure 14 about the first pivot axis PA1 from the intermediate position P13 to the actuated end position P12.

As seen in FIG. 1, the robot arm apparatus 10 includes the welding torch 38. The welding torch 38 is configured to weld a work 2 by using a welding wire 4. The robot arm 12 is configured to move the welding torch 38 relative to the base structure 14. In the illustrated embodiment, the welding torch 38 is attached to the attachment member 36 of the robot arm 12 as the end effector. The robot arm apparatus 10 is configured to perform an arc welding by using the welding torch 38. However, the robot arm apparatus 10 can be configured to perform other welding such as a spot welding.

The robot arm apparatus 10 includes a feeding device 50 configured to feed the welding wire 4 to the welding torch 38. The feeding device 50 is mounted to the supporting device 40. In this embodiment, the feeding device 50 is mounted to the first transmitting member 46.

As seen in FIG. 5, the feeding device 50 is mounted to the second end 46b of the first transmitting member 46. The feeding device 50 is movable relative to the base structure 14 about the assist pivot axis PA6 between the rest position P21 and the assist end position P22. This can reduce an amount of change in a distance defined between the feeding device 50 and the first arm 16.

As seen in FIG. 1, the feeding device 50 includes a feeding actuator 52 configured to move the welding wire 4 to feed the welding wire 4 to the welding torch 38. Examples of the feeding actuator 52 include a motor. The feeding actuator 52 is configured to move the welding wire 4 relative to the welding torch 38 in a forward direction D11 and a backward direction D12 opposite to the forward direction D11. The feeding actuator 52 is also configured to stop moving the welding wire 4 relative to the welding torch 38. The forward direction D11 and the backward direction D12 are defined with respect to the welding torch 38. The feeding actuator 52 moves the welding wire 4 relative to the welding torch 38 in the forward direction D11 so that an end of the welding wire 4 approaches the work 2. The feeding actuator 52 moves the welding wire 4 relative to the welding torch 38 in the backward direction D12 so that the end of the welding wire 4 moves away from the work 2.

The robot arm apparatus 10 includes a conduit cable 54 and a gas hose 56. The conduit cable 54 connects a pale pack 58 to the welding torch 38 through the feeding device to conduct the welding wire 4 from the pail pack to the welding torch 38. The gas hose 56 connects a gas cylinder 60 to the welding torch 38 to conduct shielding gas from the gas cylinder 60 to the welding torch 38. Examples of the shielding gas include carbon dioxide, argon, and a mixed gas of carbon dioxide and argon. The feeding device 50 includes a control valve 62 configured to control flow of the shielding gas. One of the feeding actuator 52 and the control valve 62 can be omitted from the feeding device 50. In a case where the feeding actuator 52 is omitted from the feeding device 50, the conduit cable 54 can be arranged on another route without through the feeding device 50. In a case where the control valve 62 is omitted from the feeding device 50, the gas hose 56 can be arranged on another route without through the feeding device 50.

The base actuator 28 and the first to fifth actuators 20, 22, 30, 32, and 34 have substantially the same structures as each other. Each of the base actuator 28 and the first to fifth actuators 20, 22, 30, 32, and 34 includes a three-phase alternating current (AC) motor. However, each of the base actuator 28 and the first to fifth actuators 20, 22, 30, 32, and 34 can include other actuators such as a direct current (DC) motor. The base actuator 28 will be described in detail below as the actuator. Each of the base actuator 28 and the first to fifth actuators 20, 22, 30, 32, and 34 can also be referred to as the actuator 28, 20, 22, 30, 32, and 34.

Figure 9:
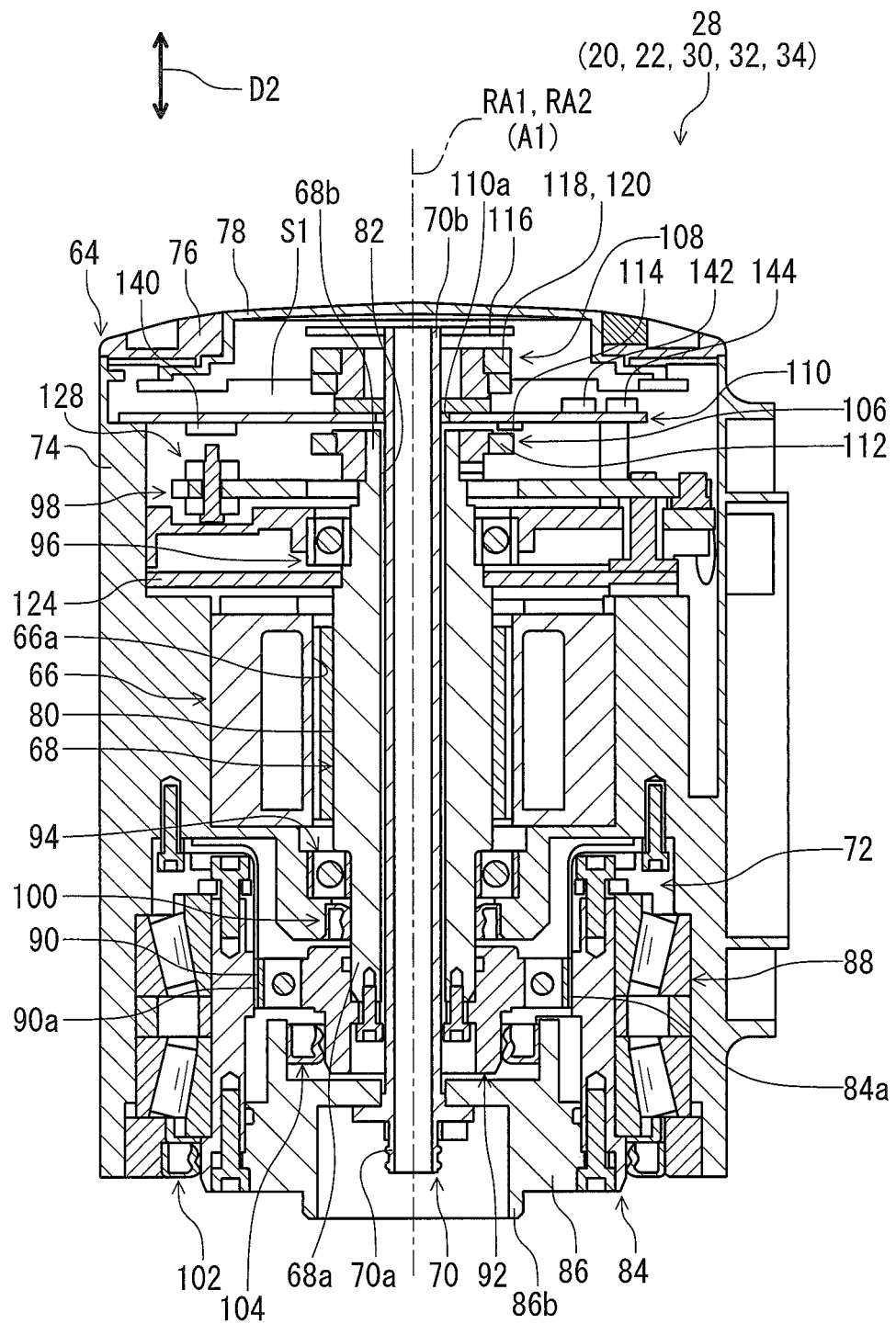
FIG. 9 is a cross-sectional view of an actuator of the robot arm.

As seen in FIG. 9, the actuator 28 includes a housing 64, a stator 66, a rotor 68, an output shaft 70, and a speed reducer 72. The housing 64 includes an internal space S1. In this embodiment, the housing 64 includes a cylindrical part 74, a first cap 76, and a second cap 78. The first cap 76 is detachably attached to an end of the cylindrical part 74. The second cap 78 is detachably attached to the first cap 76. The cylindrical part 74, the first cap 76, and the second cap 78 define the internal space S1. The internal space S1 is provided radially inward of the cylindrical part 74. In this embodiment, the housing 64 includes separate members such as the cylindrical part 74, the first cap 76, and the second cap 78. However, the housing 64 can be integrally provided as a one-piece unitary member.

As seen in FIG. 9, the stator 66 is provided in the internal space S1. The stator 66 includes a coil configured to generate magnetic field. The stator 66 is secured to the housing 64 and includes an opening 66a. The rotor 68 is rotatable relative to the stator 66 about an input rotational axis RA1. The rotor 68 is provided in the internal space S1. The rotor 68 extends through the opening 66a of the stator 66. The actuator 28 includes a magnet 80 attached to the rotor 68.

The output shaft 70 is rotatable relative to the stator 66 and the rotor 68 about an output rotational axis RA2. The output shaft 70 is provided in the internal space S1. The output rotational axis RA2 substantially coincides with the input rotational axis RA1. In this embodiment, the output rotational axis RA2 coincides with the input rotational axis RA1. The input rotational axis RA1 and the output rotational axis RA2 correspond to the base axis A1. Both the input rotational axis RA1 and the output rotational axis RA2 can correspond to each of the first to fifth pivot axes PA1 to PA5 in a case where the actuator of FIG. 9 corresponds to each of the first to fifth actuators 20, 22, 30, 32, and 34.

The rotor 68 includes a through-hole 82 extending along the input rotational axis RA1. The output shaft 70 extends through the through-hole 82. The rotor 68 includes a first rotor end 68a and a second rotor end 68b opposite to the first rotor end 68a in an axial direction D2 parallel to the input rotational axis RA1. The output shaft 70 includes a first output end 70a and a second output end 70b opposite to the first rotor 68 in the axial direction D2.

The speed reducer 72 is configured to couple the rotor 68 to the output shaft 70 to reduce a rotational speed of the output shaft 70 relative to a rotational speed of the rotor 68. The speed reducer 72 is provided in the internal space S1. The speed reducer 72 is configured to couple the first rotor end 68a to the first output end 70a to reduce the rotational speed of the output shaft 70 relative to the rotational speed of the rotor 68.

In this embodiment, the speed reducer 72 includes a circular spline 84, a coupling member 86, an outer bearing 88, a flexible spline 90, and a wave generating structure 92. The circular spline 84 includes inner teeth 84a and is rotatable relative to the housing 64 about the input rotational axis RA1. The circular spline 84 is secured to the output shaft 70 via the coupling member 86. The outer bearing 88 rotatably supports the circular spline 84 about the input rotational axis RA1. The flexible spline 90 includes outer teeth 90a and is provided in the circular spline 84 to be elastically deformable. The flexible spline 90 has an oval and annular shape.

A part of the outer teeth 90a meshes with the inner teeth 84a of the circular spline 84, and the remaining of the outer teeth 90a is spaced apart from the inner teeth 84a of the circular spline 84. The wave generating structure 92 is secured to the rotor 68 and is provided in the flexible spline 90. The wave generating structure 92 changes the shape of the flexible spline 90 to change points at which the inner teeth 84a mesh with the outer teeth 90a. The structure of the speed reducer 72 is not limited to this embodiment. The speed reducer 72 can have other structures such as a planetary gear structure or a cyclo-speed reducer.

The actuator 28 further includes a first bearing 94 and a second bearing 96. The first bearing 94 is configured to rotatably couple the rotor 68 to the housing 64. The first bearing 94 is provided in the internal space S1. The second bearing 96 is configured to rotatably couple the rotor 68 to the housing 64. The second bearing 96 is provided in the internal space S1. The first bearing 94 is closer to the first rotor end 68a than to the second rotor end 68b. The second bearing 96 is closer to the second rotor end 68b than to the first rotor end 68a. In this embodiment, the first bearing 94 is attached to the housing 64. The second bearing 96 is attached to a braking structure 98 secured to the housing 64. The braking structure 98 will be describe and/or illustrated in detail later.

The actuator 28 includes a first seal member 100, a second seal member 102, and a third seal member 104. The first seal member 100 is provided between the housing 64 and the rotor 68. The second seal member 102 is provided between the housing 64 and the circular spline 84. The third seal member 104 is provided between the coupling member 86 and the wave generating structure 92. The speed reducer 72 is sealed by the first to third seal members 100, 102, and 104. Lubricant is provided in the speed reducer 72.

The actuator 28 further includes a first rotary encoder 106 and a second rotary encoder 108. The first rotary encoder 106 is configured to sense a first rotational position of the rotor 68 relative to the stator 66. The first rotary encoder 106 is provided in the internal space S1. The second rotary encoder 108 is configured to sense a second rotational position of the output shaft 70 relative to the stator 66. The second rotary encoder 108 is provided in the internal space S1.

In this embodiment, the first rotary encoder 106 is configured to sense an absolute rotational position of the rotor 68 relative to the stator 66. The second rotary encoder 108 is configured to sense a relative rotational position of the output shaft 70 relative to the stator 66. The first rotary encoder 106 includes a magnetic rotary encoder. The second rotary encoder 108 includes an optical rotary encoder. However, the first rotary encoder 106 can be other rotary encoders such as an optical rotary encoder. The second rotary encoder 108 can be other rotary encoders such as a magnetic rotary encoder.

The first rotary encoder 106 is provided between the second rotary encoder 108 and the stator 66 in an axial direction D2 parallel to the input rotational axis RA1. The first rotary encoder 106 is closer to the second rotor end 68b than to the first rotor end 68a. The second rotary encoder 108 is closer to the second output end 70b than to the first output end 70a.

The actuator 28 further includes a control substrate 110 provided between the first rotary encoder 106 and the second rotary encoder 108 in an axial direction D2 parallel to the input rotational axis RA1. The control substrate 110 is provided in the internal space S1. The control substrate 110 is secured to the housing 64. The first rotary encoder 106 is mounted to the control substrate 110. The second rotary encoder 108 is secured to the housing 64. The control substrate 110 includes a hole 110a. The output shaft 70 extends through the hole.

In this embodiment, the first rotary encoder 106 includes a magnetic wheel 112 and a magnetoresistance (MR) sensor 114. The magnetic wheel 112 is secured to the second rotor end 68b of the rotor 68. The MR sensor 114 is mounted on the control substrate 110 to face the magnetic wheel 112. The MR sensor 114 is configured to sense change in magnetic field generated by the magnetic wheel 112.

The second rotary encoder 108 includes a code wheel 116, and a light emitting element 118, and a light receiving element 120. The code wheel 116 is secured to the second output end 70b of the output shaft 70. The light emitting element 118 is configured to emit light to the code wheel 116. The light receiving element 120 is configured to receive light reflected by the code wheel 116. The light emitting element 118 and the light receiving element 120 are mounted on the control substrate 110.

The actuator 28 further includes the braking structure 98 configured to apply a braking force F21 to the rotor 68. The braking structure 98 is provided in the internal space S1. The braking structure 98 is provided between the first rotary encoder 106 and the stator 66 in an axial direction D2 parallel to the input rotational axis RA1. The braking structure 98 is secured to the housing 64.

Figure 10:
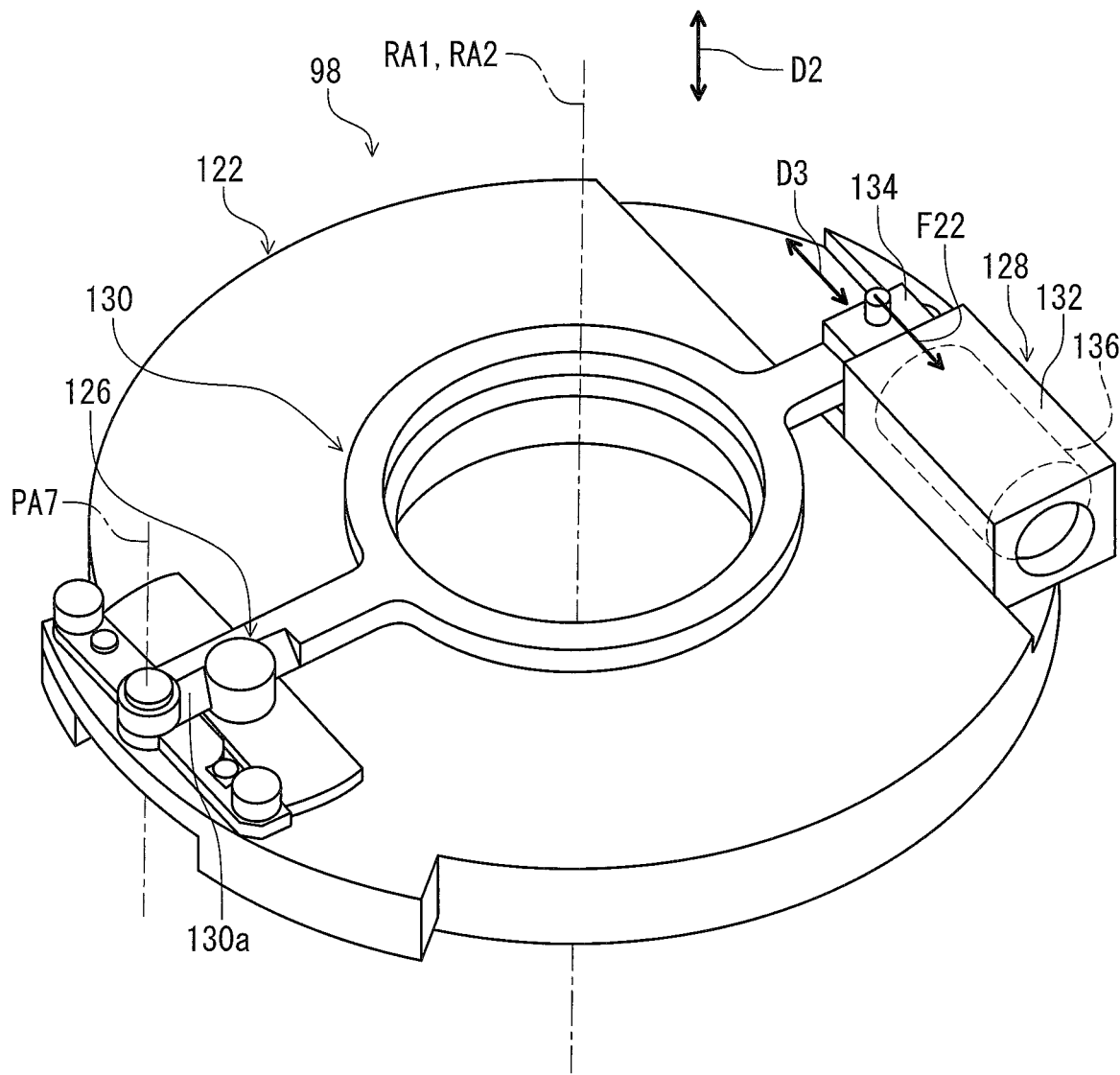
FIG. 10 is a perspective view of a braking structure of the actuator.
Figure 11:
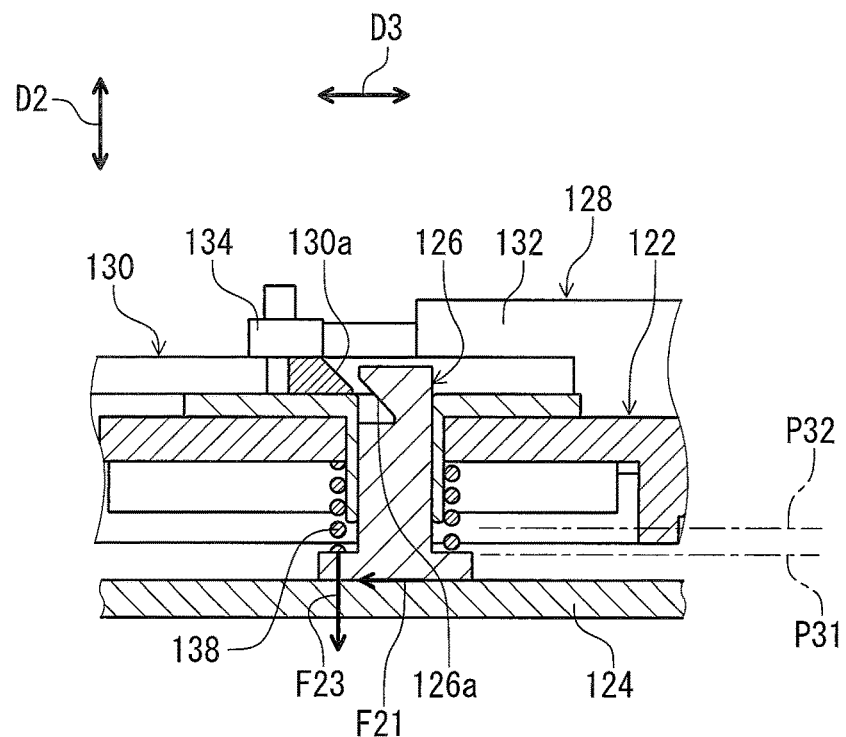
FIG. 11 is a partial cross-sectional view of the braking structure (braking position).
Figure 12:
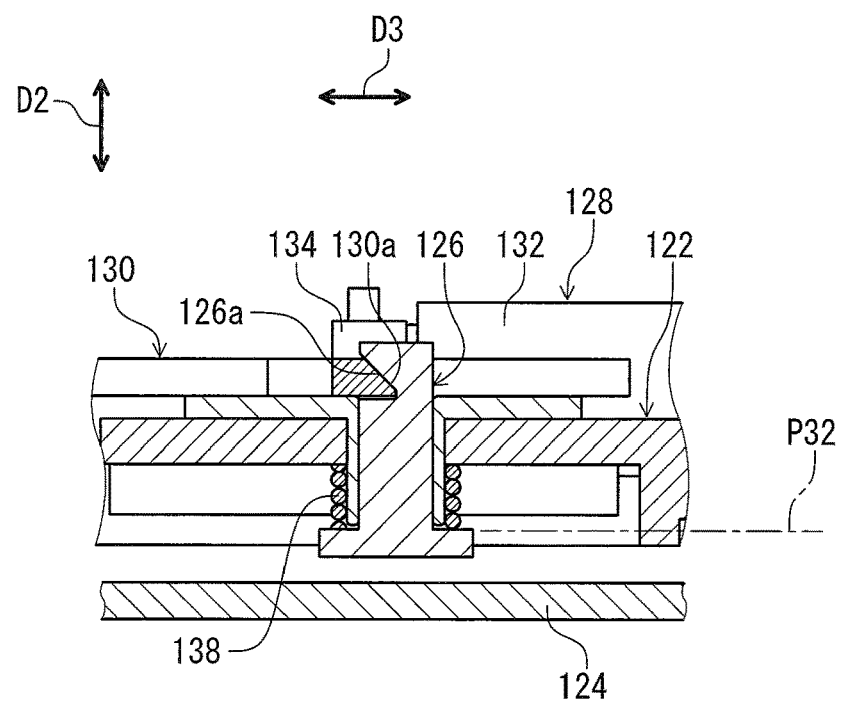
FIG. 12 is a partial cross-sectional view of the braking structure (releasing position).

As seen in FIG. 10, the braking structure 98 includes a brake base 122, a brake rotor 124 (FIG. 9), a braking member 126, a braking actuator 128, and a transmitting part 130. The brake rotor 124 is coupled to the rotor 68 to be rotatable together with the rotor 68 relative to the brake base 122. As seen in FIGS. 11 and 12, the braking member 126 is movable relative to the brake base 122 in the axial direction D2 parallel to the input rotational axis RA1 between a braking position P31 and a releasing position P32.

As seen in FIG. 11, the braking member 126 is in contact with the brake rotor 124 to apply the braking force F21 to the brake rotor 124 in a braking state where the braking member 126 is positioned at the braking position P31. As seen in FIG. 12, the braking member 126 is spaced apart from the brake rotor 124 to release the braking force F21 from the brake rotor 124 in a releasing state where the braking member 126 is positioned at the releasing position P32.

As seen in FIG. 10, the braking actuator 128 is configured to generate an actuating force F22 in a movement direction D3 different from the axial direction D2. The transmitting part 130 is configured to transmit the actuating force F22 from the braking actuator 128 to the braking member 126 to move the braking member 126 between the braking position P31 and the releasing position P32. The braking actuator 128 includes an electromagnetic actuator configured to convert electrical power to the actuating force F22.

Examples of the electromagnetic actuator include an electromagnetic solenoid. The braking actuator 128 includes a casing 132 and a plunger 134. The casing 132 includes a coil 136. The plunger 134 is movable relative to the casing 132. The casing 132 and the plunger 134 generate the actuating force F22. The plunger 134 is coupled to the transmitting part 130.

The transmitting part 130 is movable relative to the brake base 122 in the movement direction D3 to transmit the actuating force F22 from the braking actuator 128 to the braking member 126 to move the braking member 126 between the braking position P31 and the releasing position P32. The transmitting part 130 is configured to transmit the braking force F21 from the braking actuator 128 to the braking member 126 to move the braking member 126 from the braking position P31 to the releasing position P32.

The transmitting part 130 is pivotable relative to the brake base 122 about a brake pivot axis PA7. The brake pivot axis PA7 is substantially parallel to the input rotational axis RA1. The braking actuator 128 is farther from the brake pivot axis PA7 than the braking member 126. The rotor 68 is provided between the braking member 126 and the braking actuator 128.

As seen in FIGS. 11 and 12, the braking member 126 includes a first sliding surface 126a inclined relative to the axial direction D2. The transmitting part 130 includes a second sliding surface 130a inclined relative to the axial direction D2. The first sliding surface 126a is slidable with the second sliding surface 130a to move the braking member 126 between the braking position P31 and the releasing position P32.

The braking structure 98 includes a biasing element 138 configured to bias the braking member 126 toward the braking position P31 relative to the brake base 122. The transmitting part 130 is configured to transmit the actuating force F22 to the braking member 126 to move the braking member 126 toward the releasing position P32 relative to the brake base 122 against a biasing force F23 of the biasing element 138.

Figure 13:
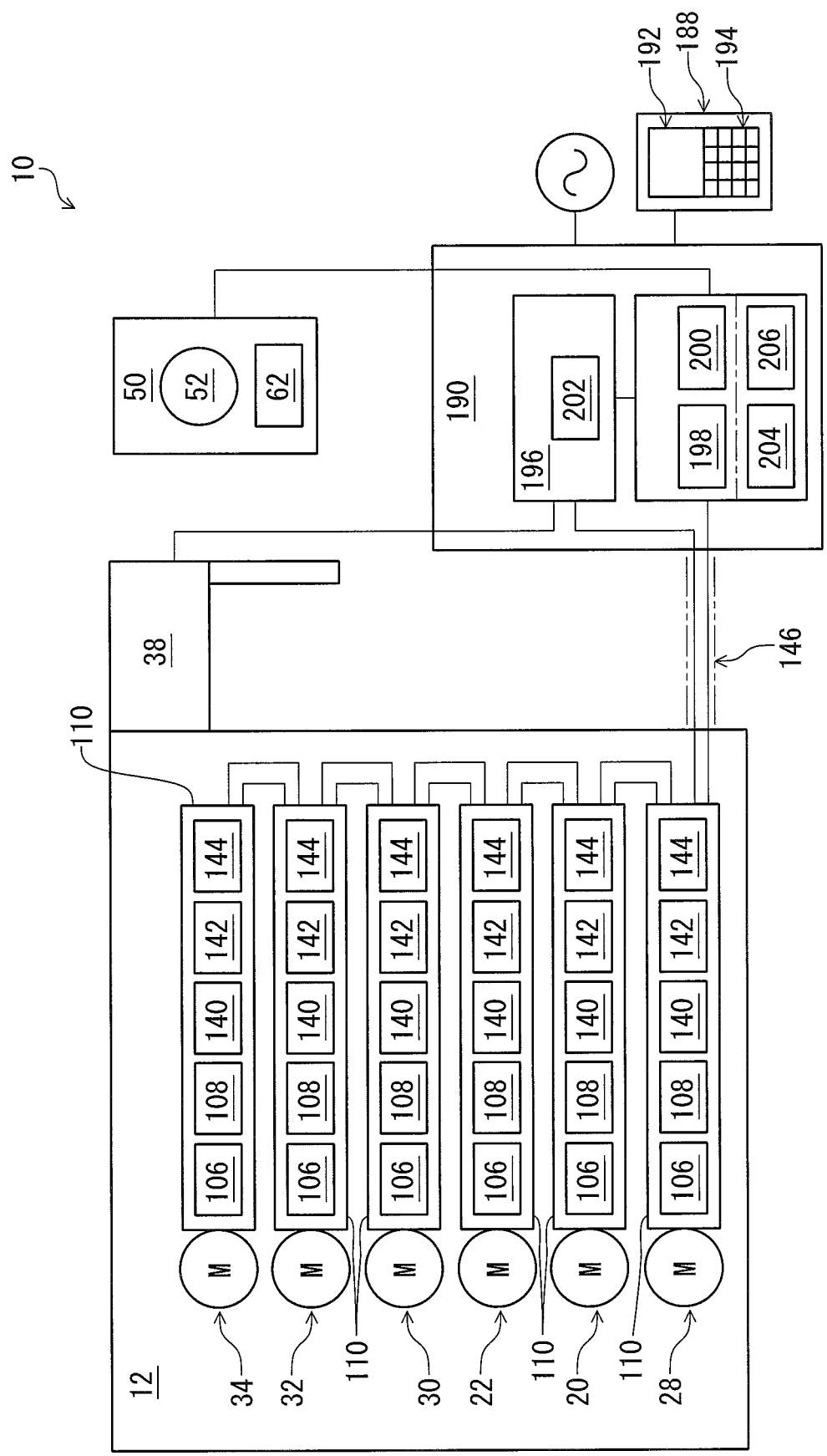
FIG. 13 is a block diagram of the robot arm apparatus.

As seen in FIGS. 9 and 13, the actuator 28 includes a braking controller 140 configured to control the braking structure 98 to apply and release the braking force F21 (FIG. 11) to and from the rotor 68. The brake controller is provided in the internal space S1. The braking controller 140 is mounted on the control substrate 110. The braking controller 140 is electrically connected to the braking actuator 128.

The actuator 28 further includes a servo controller 142 configured to control rotation of the rotor 68 based on the first rotational position and the second rotational position. The servo controller 142 is provided in the internal space S1. The servo controller 142 is mounted on the control substrate 110.

The actuator 28 includes a converter 144 configured to input electrical power to output electrical power different from the input electrical power. The converter 144 is configured to convert one of a direct current (DC) and a single-phase alternating current (AC) to a three-phase alternating current. In this embodiment, the converter 144 is configured to convert the single-phase AC to the three-phase AC. The converter 144 is provided in the internal space S1. The converter 144 is mounted on the control substrate 110. The stator 66 is configured to be electrically connected to the converter 144.

As seen in FIG. 13, each of the first to fifth actuators 20, 22, 30, 32, and 34 have the same configurations as that of the base actuator 28. Thus, the configurations of each of the first to fifth actuators 20, 22, 30, 32, and 34 will not be described in detail here for the sake of brevity.

As seen in FIG. 13, the robot arm 12 includes an electrical cable 146. The actuators 28, 20, 22, 30, 32, and 34 are each configured to movably couple adjacent two of the links 16, 18, 24, 26, and 36 (FIG. 2) to provide a serial-link robot arm. The electrical cable 146 is configured to be electrically connect the actuators 28, 20, 22, 30, 32, and 34 to each other in series. In the illustrated embodiment, the electrical cable 146 includes multiple cores for delivering electrical power and electric signals. The actuators 28, 20, 22, 30, 32, and 34 are electrically connected to each other in series via power lines of the electrical cable 146. The actuators 28, 20, 22, 30, 32, and 34 are electrically connected to each other in series via signal lines of the electrical cable 146. Electrical power is supplied to the actuators 28, 20, 22, 30, 32, and 34 via the power lines of the electrical cable 146. Control signals are supplies to the actuators 28, 20, 22, 30, 32, and 34 via the signal lines. For example, the electrical cable 146 includes four cores for power lines and two cores for signal lines. However, a total number of cores of the electrical cable 146 is not limited to this embodiment.

The converter 144 is configured to convert one of the direct current and the single-phase alternating current to the three-phase alternating current. The electrical cable 146 is configured to be electrically connect the converters 144 of the actuators 28, 20, 22, 30, 32, and 34 to each other in series.

Figure 14:
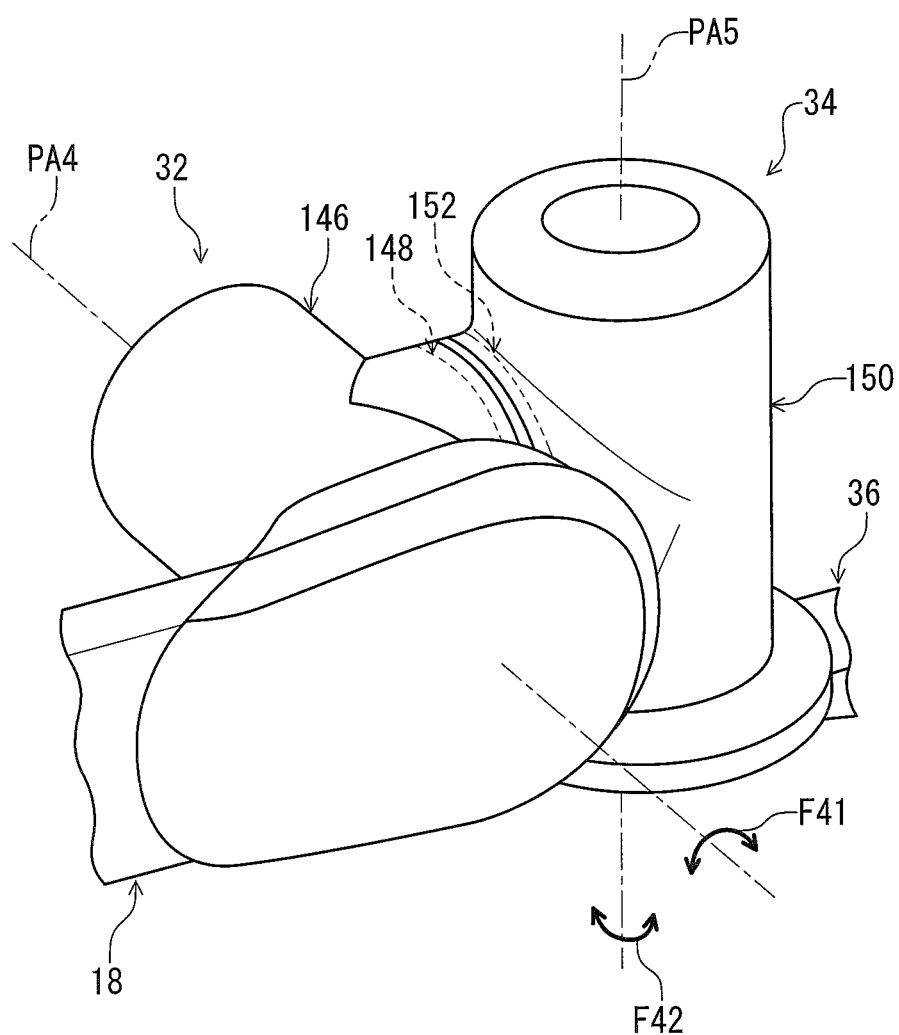
FIG. 14 is a perspective view of actuators.

As seen in FIG. 14, the fourth actuator 32 (one example of a first actuating device) is directly coupled to the fifth actuator 34 (one example of a second actuating device). The fourth actuator 32 can also be referred to as a first actuating device 32. The fifth actuator 34 can also be referred to as a second actuating device 34. The first actuating device 32 is configured to generate a first actuating force F41. The second actuating device 34 is configured to generate a second actuating force F42.

The first actuating device 32 includes a first housing 146 and a first coupling part 148 secured to the first housing 146. The second actuating device 34 includes a second housing 150 and a second coupling part 152 secured to the second housing 150. Each of the first housing 146 and the second housing 150 corresponds to the housing 64 illustrated in FIG. 9. Each of the first housing 146 and the second housing 150 has substantially the same structure as that of the housing 64 of the base actuator 28.

Figure 15:
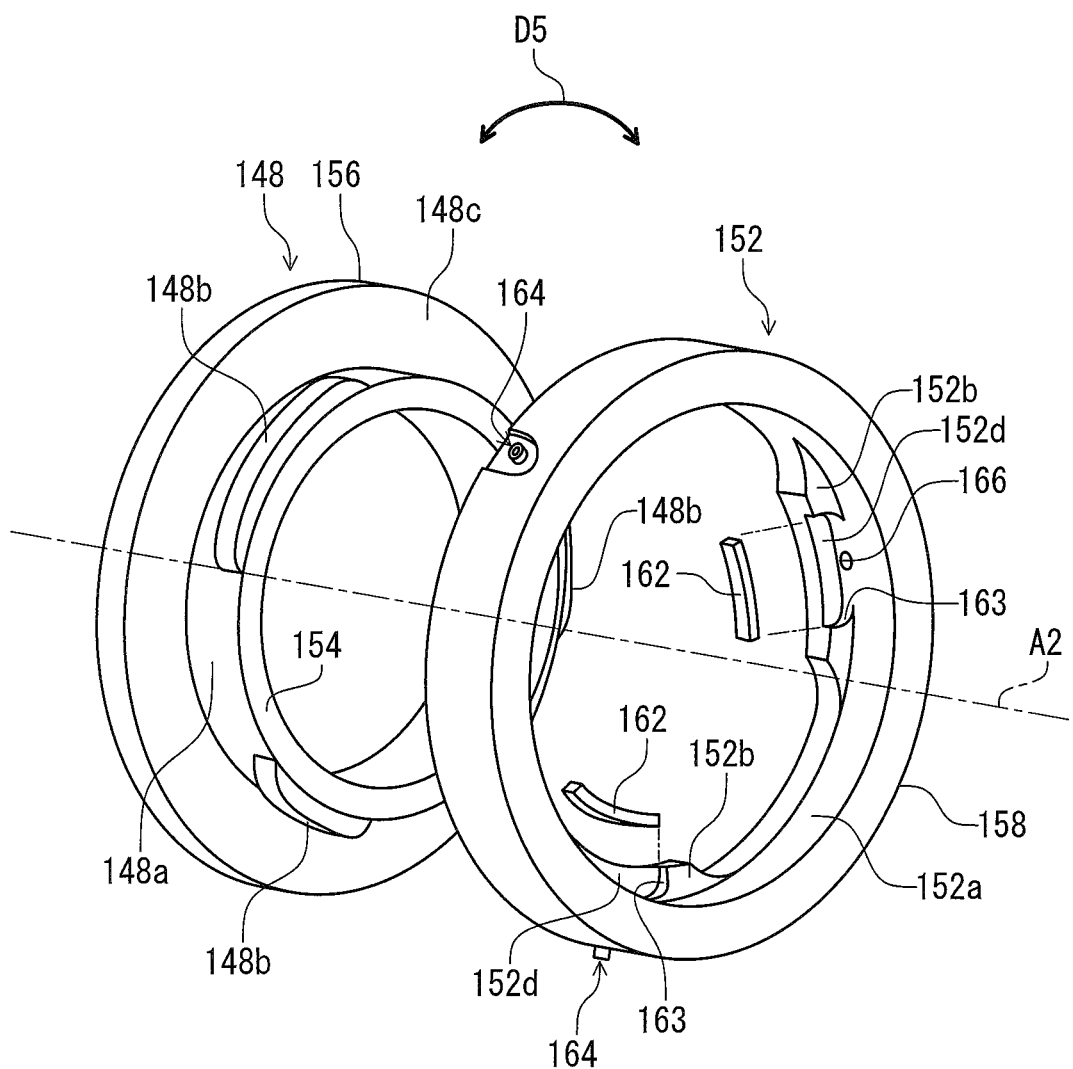
FIG. 15 is an exploded perspective view of first and second coupling parts of the actuators.

As seen in FIG. 15, the first coupling part 148 includes a first outer peripheral surface 148a and a first protruding portion 148b. The first protruding portion 148b protrudes radially outward from the first outer peripheral surface 148a. In this embodiment, the first coupling part 148 includes first protruding portions 148b spaced apart from each other in a circumferential direction D5 of the first coupling part 148.

Furthermore, the first coupling part 148 includes a first cylindrical portion 154 and a first flange 156. The first cylindrical portion 154 includes the first outer peripheral surface 148*a*. The first flange 156 has an annular shape and protrudes radially outwardly from the first outer peripheral surface 148*a*. The first protruding portions 148*b* are spaced apart from the first flange 156.

The second coupling part 152 includes a second inner peripheral surface 152*a* and a second protruding portion 152*b*. The second protruding portion 152*b* protrudes radially inward from the second inner peripheral surface 152*a*. In this embodiment, the second coupling part 152 includes second protruding portions 152*b* spaced apart from each other in a circumferential direction D5 of the second coupling part 152. Furthermore, the second coupling part 152 includes a second cylindrical portion 158. The second cylindrical portion 158 includes the second inner peripheral surface 152*a*.

Figure 16:
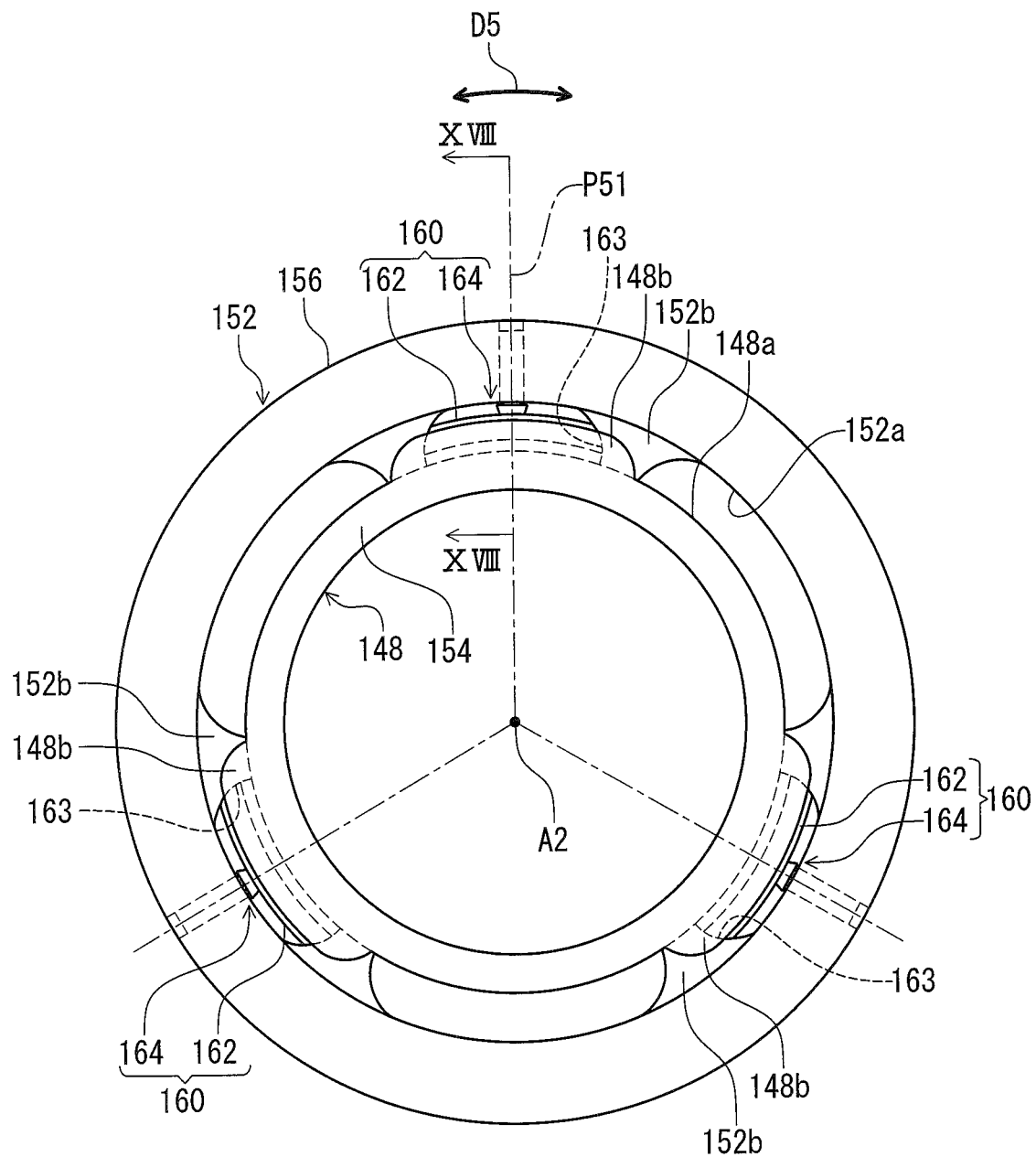
FIG. 16 is an elevational view of the first and second coupling parts (securing position).
Figure 17:
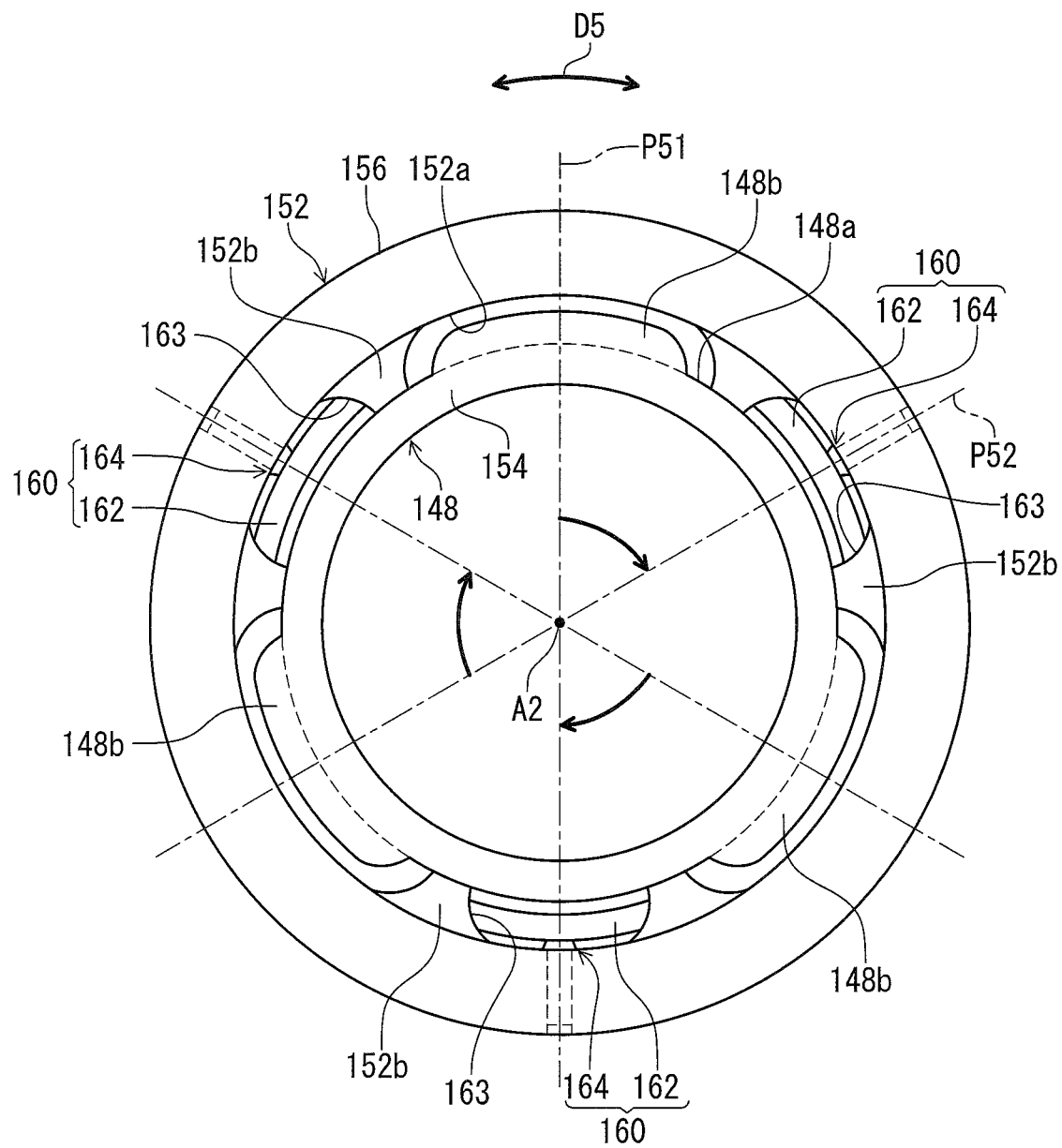
FIG. 17 is an elevational view of the first and second coupling parts (detachable position).

As seen in FIGS. 16 and 17, the second coupling part 152 is movable relative to the first coupling part 148 between a securing position P51 and a detachable position P52. The second coupling part 152 is secured to the first coupling part 148 at the securing position P51. The second coupling part 152 is detachable from the first coupling part 148 at the detachable position P52. In this embodiment, the second coupling part 152 is rotatable relative to the first coupling part 148 about a coupling axis A2 between the securing position P51 and the detachable position P52.

As seen in FIG. 16, the second protruding portion 152*b* is engaged with the first protruding portion 148*b* to secure the second coupling part 152 to the first coupling part 148 in a securing state where the second coupling part 152 is provided relative to the first coupling part 148 at the securing position P51. The first protruding portion 148*b* is provided radially inward of the second inner peripheral surface 152*a* in the securing state. The second protruding portion 152*b* is provided radially outward of the first outer peripheral surface 148*a* in the securing state.

As seen in FIG. 17, the second protruding portion 152*b* is disengageable from the first protruding portion 148*b* to detach the second coupling part 152 from the first coupling part 148 in a detachable state where the second coupling part 152 is provided relative to the first coupling part 148 at the detachable position P52.

Figure 18:
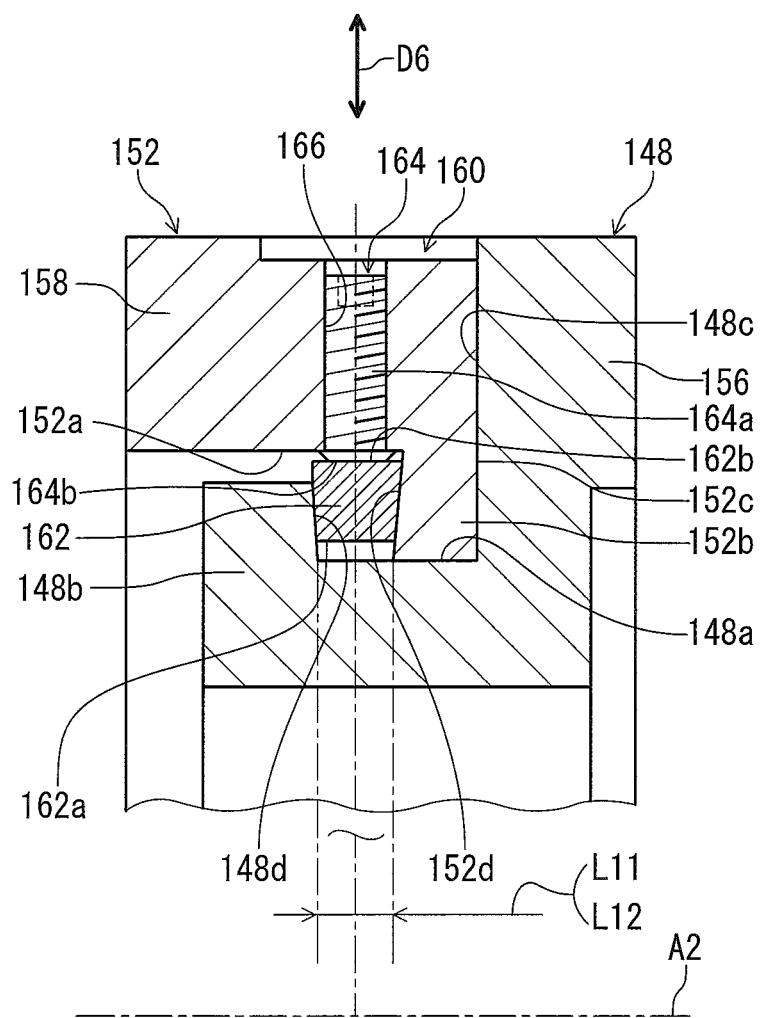
FIG. 18 is a partial cross-sectional view of the first and second coupling parts taken along line XVIII-XVIII of FIG. 16 (securing position).

As seen in FIG. 18, the first coupling part 148 includes a first receiving surface 148*c* facing in an axial direction D2 parallel to the coupling axis A2. The second coupling part 152 includes a second receiving surface 152*c* facing in the axial direction D2. In this embodiment, the first flange 156 includes the first receiving surface 148*c*. The first receiving surface 148*c* has an annular shape. The second cylindrical portion 158 includes the second receiving surface 152*c*. The second receiving surface 152*c* is contactable with the first receiving surface 148*c*. The first protruding portion 148*b* is spaced apart from the first receiving surface 148*c* in the axial direction D2 in the securing state. The second coupling part 152 is provided between the first protruding portion 148*b* and the first receiving surface 148*c* in the axial direction D2 in the securing state.

The robot arm 12 further includes a positioning structure 160 configured to position the first coupling part 148 and the second coupling part 152 relative to each other in the axial direction D2. The positioning structure 160 includes a spacer 162 configured to be fitted between the first protruding portion 148*b* and the second protruding portion 152*b* in the securing state. In this embodiment, as seen in FIGS. 15 to 17, the positioning structure 160 includes spacers 162. The second protruding portion 152*b* includes a guide recess 163. The spacer 162 is provided in the guide recess 163. The guide recess 163 radially guides the spacer 162 and holds the spacer 162 in the circumferential direction D5.

As seen in FIG. 18, the first protruding portion 148*b* and the second protruding portion 152*b* are spaced apart from each other in the axial direction D2 to define an axial distance L11 between the first protruding portion 148*b* and the second protruding portion 152*b* in the axial direction D2. The axial distance L11 increases from the first outer peripheral surface 148*a* toward the second inner peripheral surface 152*a*. The first protruding portion 148*b* includes a first securing surface 148*d* contactable with the spacer 162. The second protruding portion 152*b* includes a second securing surface 152*d* contactable with the spacer 162.

At least one of the first securing surface 148*d* and the second securing surface 152*d* is inclined relative to the axial direction D2 to increase the axial distance L11 from the first outer peripheral surface 148*a* toward the second inner peripheral surface 152*a*. In the illustrated embodiment, the first securing surface 148*d* and the second securing surface 152*d* are inclined relative to the axial direction D2 to increase the axial distance L11 from the first outer peripheral surface 148*a* toward the second inner peripheral surface 152*a*. As seen in FIG. 15, the second securing surface 152*d* is provided in the guide recess 163.

As seen in FIG. 18, the spacer 162 includes a radially inner surface 162*a* and a radially outer surface 162*b* opposite to the radially inner surface 162*a* in a radial direction D6 perpendicular to the coupling axis A2. The spacer 162 has an axial width L12 defined in the axial direction D2. The axial width L12 increases from the radially inner surface 162*a* toward the radially outer surface 162*b* in the securing state. The spacer 162 is made of a non-metallic material such as rubber or synthetic resin. The spacer 162 is elastically deformed between the first protruding portion 148*b* and the second protruding portion 152*b* in the securing state.

The positioning structure 160 includes an adjustment member 164 configured to radially move the spacer 162 relative to the first coupling part 148 and the second coupling part 152. In this embodiment, the positioning structure 160 includes adjustment members 164 respectively corresponding to the spacers 162. The adjustment member 164 is provided radially outward of the spacer 162.

The second coupling part 152 includes an adjustment threaded hole 166. In the illustrated embodiment, the second coupling part 152 includes adjustment threaded holes 166. The adjustment member 164 includes external threads 164*a* and a contact surface 164*b*. The external threads 164*a* are engaged with the adjustment threaded hole 166. The contact surface 164*b* is contactable with the spacer 162. Rotation of the adjustment member 164 relative to the second coupling part 152 changes a radial position of the spacer 162 relative to the first coupling part 148 and the second coupling part 152. Specifically, tightening of the adjustment member 164 radially inwardly moves the spacer 162 relative to the first protruding portion 148*b* and the second protruding portion 152*b*. Loosening of the adjustment member 164 allows the spacer 162 to radially outwardly move relative to the first protruding portion 148*b* and the second protruding portion 152*b*.

As seen in FIG. 2, the arm 16 includes an arm body 168 and a cover 170. The arm body 168 includes a first arm end 168*a* and a second arm end 168*b* opposite to the first arm end 168*a*. The cover 170 is configured to cover the first arm end 168*a*. In this embodiment, the arm 16 includes an additional cover 172 configured to cover the second arm end 168*b*. The additional cover 172 has substantially the same structure as that of the cover 170. The arm body 168 is made of a metallic material. For example, the arm body 168 is formed by cutting a square pipe steel with laser. The cover 170 is made of non-metallic material such as a resin material. For example, the cover 170 is made of synthetic resin.

Figure 19:
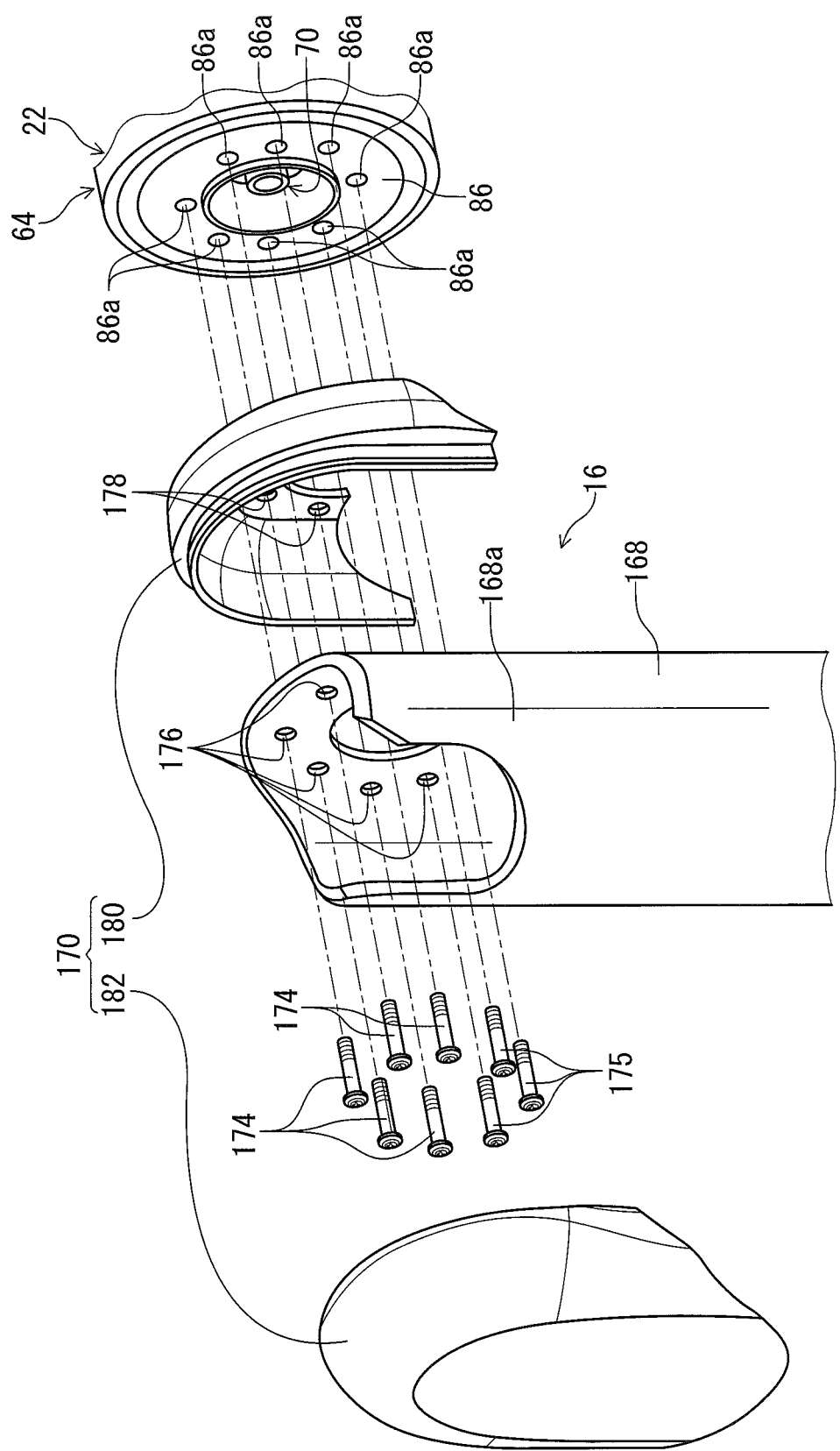
FIG. 19 is an exploded perspective view of arm of the robot arm.

As seen in FIG. 19, the actuator 22 is configured to pivotally actuate the arm 16. The output shaft 70 is rotatable relative to the housing 64. The output shaft 70 is secured to the first arm end 168a and the cover 170. In this embodiment, the output shaft 70 is secured to the first arm end 168a and the cover 170 via the coupling member 86. The coupling member 86 is secured to the first arm end 168a and the cover 170.

The cover 170 is provided between the first arm end 168a and the output shaft 70. The actuator 22 includes a fastener 174 configured to fasten the output shaft 70 to the first arm end 168a and the cover 170. In this embodiment, the actuator 22 includes fasteners 174 and 175 configured to fasten the output shaft 70 to the first arm end 168a and the cover 170 via the coupling member 86. The fasteners 174 and 175 are bolts. The coupling member 86 includes coupling threaded holes 86a. The fasteners 174 and 175 are engaged with the threaded holes 86a.

Figure 20:
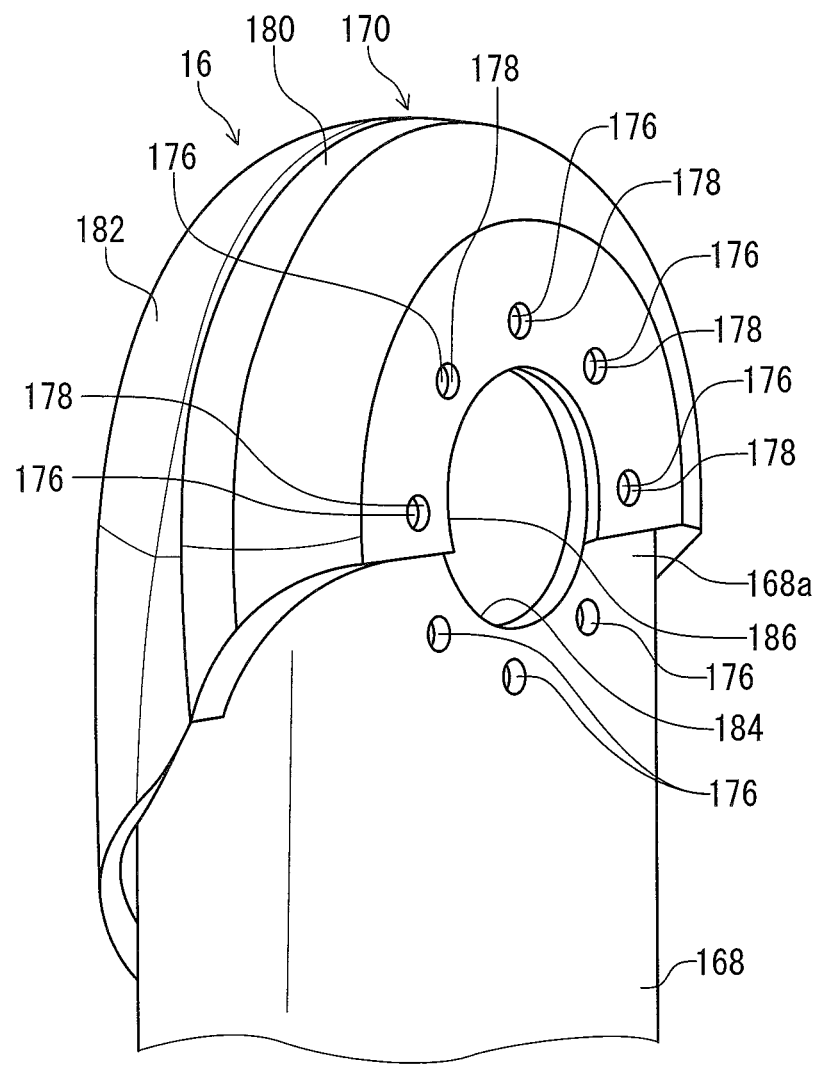
FIG. 20 is a perspective view of the arm.
Figure 21:
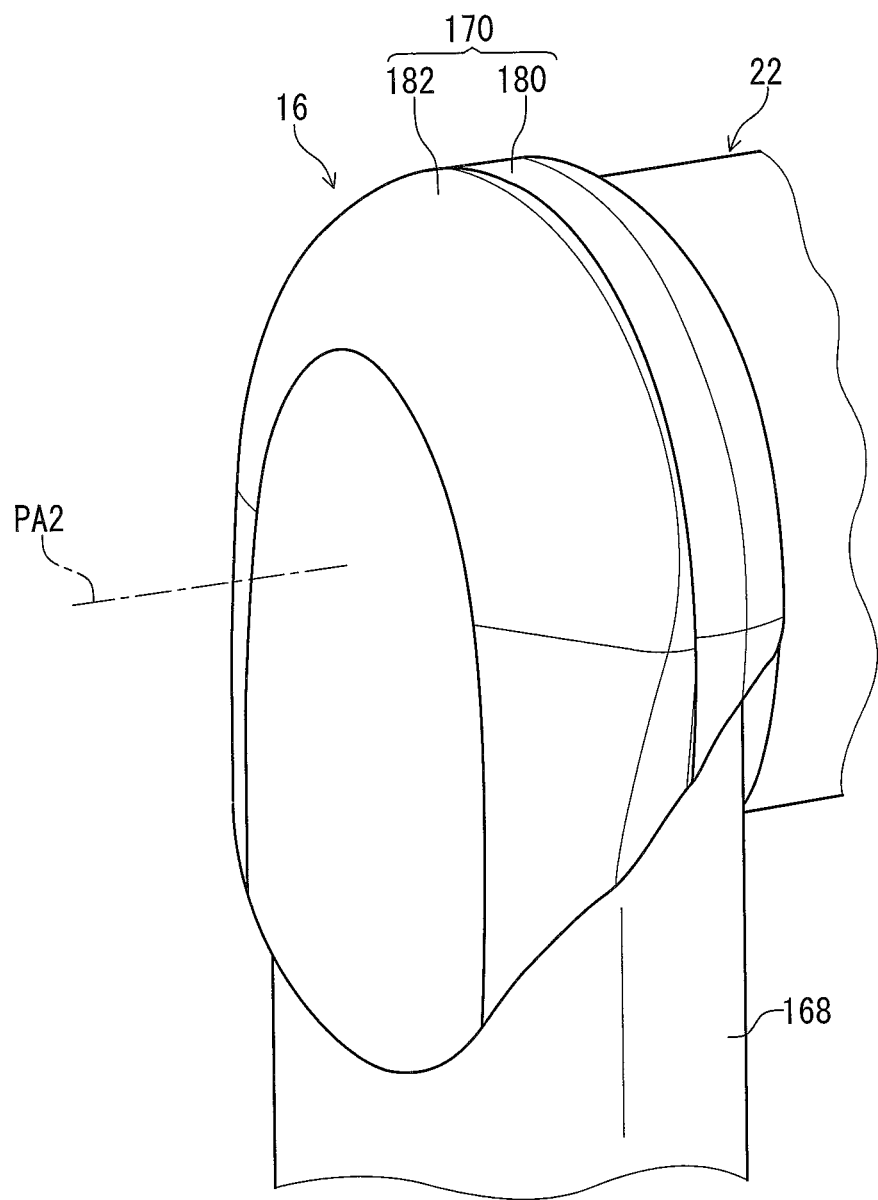
FIG. 21 is a perspective view of the arm.

As seen in FIG. 20, the first arm end 168a includes a first attachment hole 176. The cover 170 includes a second attachment hole 178. In this embodiment, the first arm end 168a includes first attachment holes 176. The cover 170 includes second attachment holes 178. As seen in FIG. 19, the fastener 174 extends through the first attachment hole 176 and the second attachment hole 178. The fastener 175 extends through the first attachment hole 176 without through the second attachment hole 178.

As seen in FIG. 20, a total number of the second attachment holes 178 is less than a total number of the first attachment holes 176. The cover 170 includes a first cover body 180 and a second cover body 182. The first cover body 180 is secured to the output shaft 70 together with the first arm end 168a. The second cover body 182 is detachably attached to the first cover body 180 as a separate member from the first cover body 180. In this embodiment, the first cover body 180 includes the second attachment holes 178.

The arm body 168 includes an opening 184. The first cover body 180 includes a recess 186. The recess 186 is provided along the opening 184 in a state where the first cover body 180 is attached to the arm body 168. An annular protruding portion 86b (FIG. 9) of the coupling member 86 is provided in the opening 184 and the recess 186 in a state where the arm is secured to the output shaft 70 of the actuator 20 via the coupling member 86 (FIG. 19). The annular protruding portion 86b radially positions the first arm 16 relative to the output rotational axis RA2.

As seen in FIG. 20, the second cover body 182 is attached to the first cover body 180 to cover the first arm end 168a of the arm body 168 after the arm body 168 and the first cover body 180 are secured to the coupling member 86 of the actuator 22 with the fasteners 174 and 175 (FIG. 19). The fasteners 174 and 175 are provided in the arm body 168 and the cover 170, improving the appearance of the arm 16. Furthermore, since the fasteners 174 and 175 are provided in the arm body 168 and the cover 170, it is possible to prevent weld spatters from being attached to the fasteners 174 and 175 when the work 2 is welded using the welding torch 38. Namely, the cover 170 protects the fasteners 174 and 175 from such weld spatters.

As seen in FIG. 1, the robot arm apparatus 10 includes an input device 188 and a robot control device 190. The input device 188 is configured to receive input information from a user and includes a display 192 and a keyboard 194. Examples of the input device 188 include a pendant controller. The input device 188 allows the user to set a target position of the welding torch 38 and motion of the robot arm 12, for example. The robot control device 190 is configured to control motion of the robot arm 12 and welding of the welding torch 38 based on the input information. The robot control device 190 includes a power controller 196, an arm controller 198, and a welding controller 200. A single-phase AC power is supplied to the power controller 196. The power controller 196 is configured to convert the single-phase AC to a three-phase AC for control power.

As seen in FIG. 13, the power controller 196 includes a welding power supply 202 configured to convert the single-phase AC to a DC voltage for the arc welding. The power controller 196 is electrically connected to the arm controller 198, the welding controller 200, the actuators 28, 20, 22, 20, 32 and 34, the welding torch 38, and the feeding device 50 to supply electrical power. The arm controller 198 is configured to control the actuators 28, 20, 22, 20, 32 and 34 of the robot arm 12 to move the welding torch 38 to the target position relative to the work 2. The welding controller 200 is configured to control the feeding device 50 and the welding power supply 202.

In this embodiment, the arm controller 198 and the welding controller 200 are integrated as a single unit. However, the arm controller 198 can be separately provided from the welding controller 200.

The robot control device 190 includes a processor 204 and a memory 206. The processor 204 includes a central processing unit (CPU). The memory 206 includes a read only memory (ROM) and a random access memory (RAM). For example, a program stored in the memory 206 is read into the processor 204, and thereby several functions of the robot control device 190 are performed. For example, the robot control device 190 is programmed to perform functions of the arm controller 198 and the welding controller 200.

The arm controller 198 is configured to control each of the actuators 28, 20, 22, 20, 32 and 34 based on the first rotational position sensed by the first rotary encoder 106 and the second rotational position sensed by the second rotary encoder 108. The first rotational position and the second rotational position are periodically sent from each of the first rotary encoders 106 and each of the second rotary encoders 108 to the arm controller 198 via the electrical cable 146. Since the first rotary encoder 106 of each of the actuators 28, 20, 22, 20, 32 and 34 senses the absolute rotational position, the arm controller 198 can calculate an orientation of the robot arm 12 and a current position of a tip end of the welding torch 38. Since the second rotary encoder 108 of each of the actuators 28, 20, 22, 20, 32 and 34 senses the relative rotational position, the arm controller 198 can correct a difference between rotational positions of the rotor 68 and the output shaft 70, improving positional accuracy of the robot arm 12.

The arm controller 198 sends command signals to the actuators 28, 20, 22, 20, 32 and 34 via the electrical cable 146 in order. The arm controller 198 periodically sends command signals respectively corresponding to the actuators with identification (ID) information via the electrical cable 146 in order. The identification information includes an ID number of each of the actuators 28, 20, 22, 20, 32 and 34. The actuators 28, 20, 22, 20, 32 and 34 recognize respective command signals for the actuators 28, 20, 22, 20, 32 and 34 among command signals sent via the electrical cable 146 using the ID information.

Figure 22:
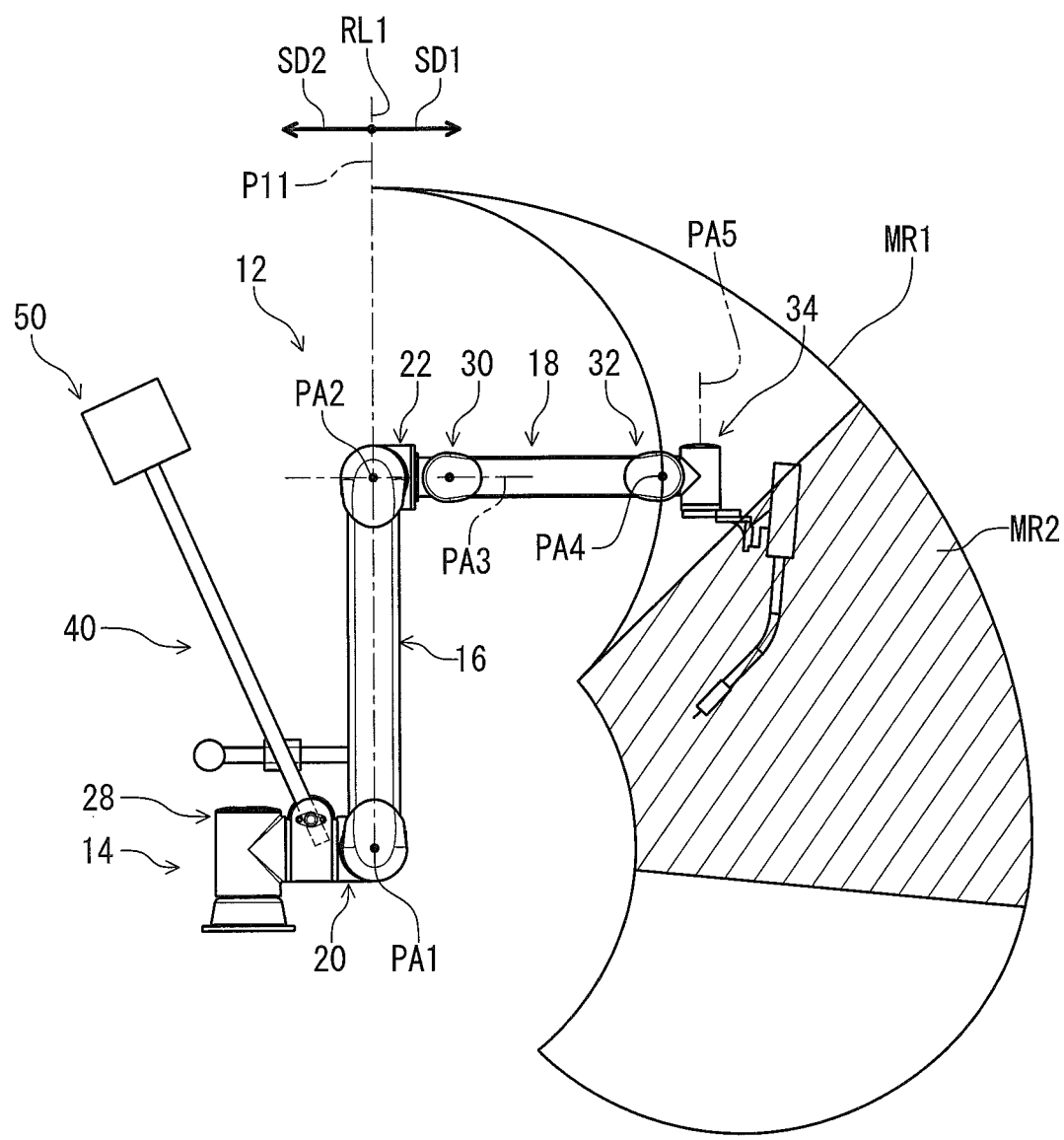
FIG. 22 is a schematic diagram showing movable ranges of the robot arm.

As seen in FIG. 22, the arm controller 198 controls the robot arm 12 (the actuators 28, 20, 22, 20, 32 and 34) so that the fourth pivot axis PA4 moves within a movable area MA1 indicated with a thick line. The movable area MA1 includes a target movable area MA2. The arm controller 198 controls the robot arm 12 (the actuators 28, 20, 22, 20, 32 and 34) so that the tip end of the welding torch 38 moves within the target movable area MA2.

The movable area MA1 is provided on a first side SD1 with respect to a reference line RL1 indicating the initial position P11. The reference line RL1 intersects with the first pivot axis PA1 and the second pivot axis PA2. A second side SD2 is opposite to the first side SD1 with respect to the reference line RL1. The movable range MA1 is provided only on the first side SD1 and is not provided on the second side SD2. Thus, it is possible to utilize the area of the second side SD2. For example, the assisting device 40 and the feeding device 50 can be provided on the second side SD2 with respect to the reference line RL1.

Figure 23:
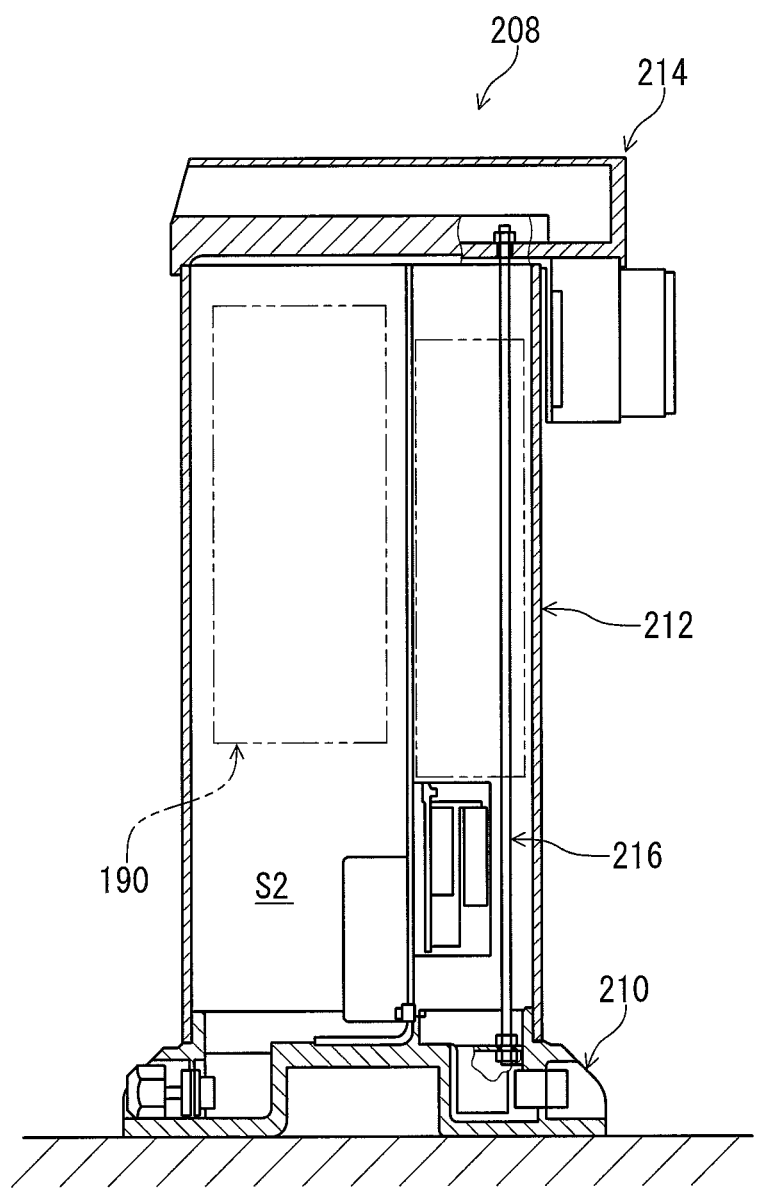
FIG. 23 is a cross-sectional view of a controller housing structure of the robot arm apparatus.

As seen in FIG. 23, the robot arm apparatus 10 includes a controller housing structure 208. The controller housing structure 208 includes a housing base 210, a housing body 212, a housing top 214, and a coupling member 216. The housing body 212 is provided on the housing base 210. The housing body 212 includes an inner space S2 in which the robot control device 190 is to be provided. The housing top 214 is provided on the housing body 212 and is spaced apart from the housing base 210. The coupling member 216 is configured to couple the housing top 214 to the housing base 210 to hold the housing body 212 between the housing top 214 and the housing base 210. In this embodiment, the housing body 212 is formed by cutting a square pipe steel with laser, for example. The housing base 210 and the housing top 214 are made of die-cast aluminum, for example. Materials of the housing base 210, the housing body 212, and the housing top 214 are not limited to this embodiment.

Figure 24:
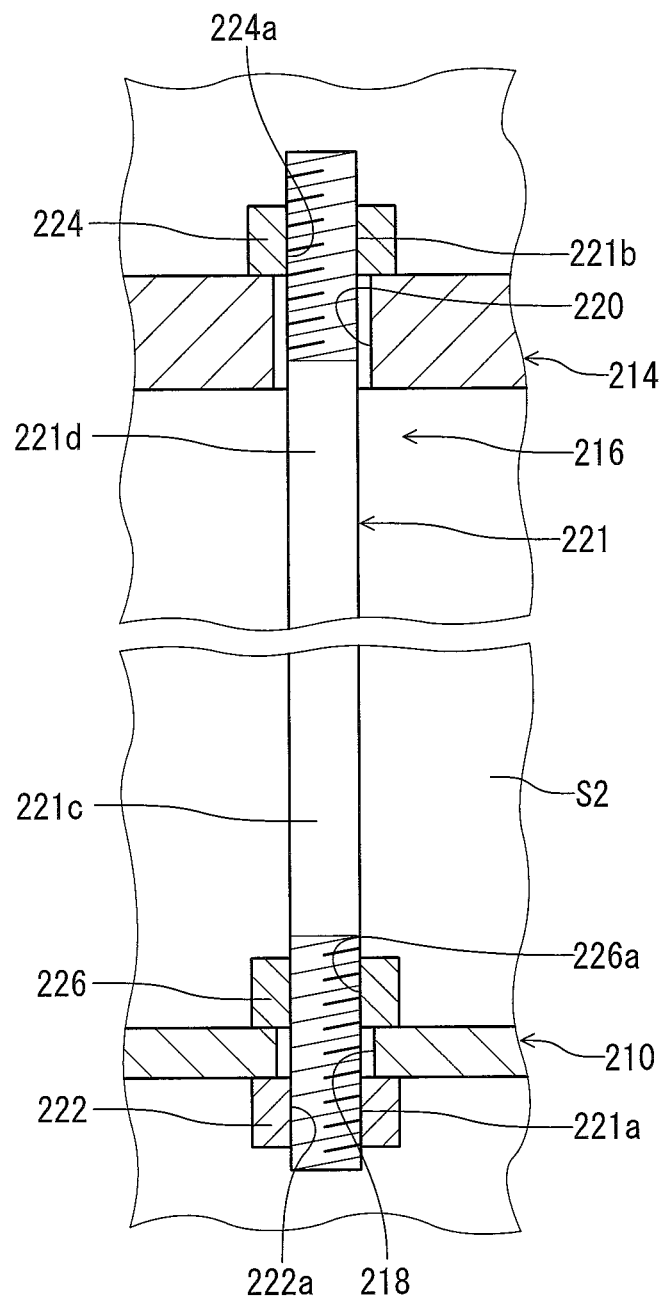
FIG. 24 is an enlarged partial cross-sectional view of the controller housing structure.

As seen in FIG. 24, the housing base 210 includes a first through-hole 218. The housing top 214 includes a second through-hole 220. The coupling member 216 includes a coupling rod 221 extending between the housing base 210 and the housing top 214. The coupling rod 221 extends through the first through-hole 218 and the second through-hole 220. The first through-hole 218 is free of an internal thread. The second through-hole 220 is free of an internal thread.

The coupling member 216 includes a first securing element 222 and a second securing element 224. The first securing element 222 has a first threaded hole 222a. The second securing element 224 has a second threaded hole 224a. The coupling rod 221 includes first external threads 221a and second external threads 221b. The first external threads 221a are engaged with the first threaded hole 222a. The second external threads 221b are engaged with the second threaded hole 224a.

In the illustrated embodiment, the coupling rod 221 includes a first rod end 221c and a second rod end 221d opposite to the first rod end 221c. The first external threads 221a is provided at the first rod end 221c. The second external threads 221b is provided at the second rod end 221d. The housing base 210 and the housing top 214 are provided between the first securing element 222 and the second securing element 224. The coupling rod 221 is provided in the inner space S2. In the illustrated embodiment, the coupling rod 221 is partly provided in the inner space S2 and extends through the inner space S2.

The coupling member 216 includes a third securing element 226. The third securing element 226 has a third threaded hole 226a. The first external threads 221a are engaged with the third threaded hole 226a. A base plate 210a of the housing base 210 is held between the first securing element 222 and the third securing element 226. The third securing element 226 can be omitted from the coupling member 216.

The robot arm apparatus 10 includes the following features.

(A-1) The robot arm apparatus 10 includes the assisting device 40 configured to apply the assist rotational force F1 to the first arm 16 to assist the first actuator 20. Accordingly, it is possible to assist the first actuator 20 by using the assist rotational force F1 applied from the assist device, reducing load of the first actuator 20. Since the assist device uses the assist rotational force F1, it is possible to simplify the structure of the assist device. Namely, it is possible to reduce the load of the first actuator 20 with a simple structure.

(A-2) The first arm 16 is pivotable relative to the base structure 14 about the first pivot axis PA1 within a first pivotable range PR1. The assisting device 40 is configured to apply the assist rotational force F1 to the first arm 16 while the first arm 16 pivots relative to the base structure 14 about the first pivot axis PA1 within the second pivotable range PR2 smaller than the first pivotable range PR1. Accordingly, it is possible to adjust a range in which the assist rotational force F1 is applied to the first actuator 20 in accordance with structure of the robot arm apparatus 10 and/or specification of the first actuator 20.

(A-3) The force-generating member 42 includes the torsion coil spring configured to generate the assist rotational force F1. Accordingly, it is possible to simplify the structure of the assisting device 40, reducing manufacturing cost of the robot arm 12.

(B-1) Since the feeding device 50 is mounted to the supporting device 40, it is possible to reduce weight applied from the feeding device 50 to the robot arm 12, allowing an actuator of the arm robot to be compact. This can reduce the manufacturing cost of the robot arm apparatus 10.

(B-2) The first transmitting member 46 is pivotable relative to the base structure 14 about the support pivot axis PA6 in response to pivotal movement of the first arm 16 relative to the base structure 14. Accordingly, it is possible to move the feeding device 50 in response to the pivotal movement of the first arm 16, reducing an amount of change in a distance between the feeding device 50 and the first arm 16. This can shorten a length of a cable and/or a hose extending between the feeding device 50 and the first arm 16.

(B-3) Since the feeding device 50 is mounted to the second end 46b of the first transmitting member 46, it is possible to enlarge a movable range of the feeding device 50.

(B-4) Since the support pivot axis PA6 is substantially parallel to the first pivot axis PA1, it is possible to easily move the feeding device 50 about the support pivot axis PA6 in response to the pivotal movement of the first arm 16.

(C-1) The housing 64 includes the internal space S1. Each of the stator 66, the rotor 68, the output shaft 70, and the speed reducer 72 is provided in the internal space S1. This allows the actuator to be compact.

(C-2) Since the output shaft 70 extends through the through-hole 82 of the rotor 68, it is possible to utilize a space defined in the through-hole 82 of the rotor 68, allowing the actuator to be more compact.

(C-3) The speed reducer 72 is configured to couple the first rotor end 68a to the first output end 70a to reduce the rotational speed of the output shaft 70 relative to the rotational speed of the rotor 68. Accordingly, it is possible to efficiently arrange the speed reducer 72 in the internal space S1 of the housing 64.

(C-4) The first bearing 94 is closer to the first rotor end 68*a* than to the second rotor end 68*b*. The second bearing 96 is closer to the second rotor end 68*b* than to the first rotor end 68*a*. Accordingly, it is possible to stabilize rotation of the rotor 68.

(C-5) The first rotary encoder 106 is configured to sense the first rotational position of the rotor 68 relative to the stator 66. The second rotary encoder 108 is configured to sense the second rotational position of the output shaft 70 relative to the stator 66. Accordingly, it is possible to calculate a difference between the first rotational position of the rotor 68 and the second rotational position of the output shaft 70, improving accuracy of control of the actuator.

(C-6) The first rotary encoder 106 is configured to sense the absolute rotational position of the rotor 68 relative to the stator 66. The second rotary encoder 108 is configured to sense a relative rotational position of the output shaft 70 relative to the stator 66. Accordingly, it is possible to further improve the accuracy of control of the actuator.

(C-7) The first rotary encoder 106 includes a magnetic rotary encoder. The second rotary encoder 108 includes an optical rotary encoder. Accordingly, it is possible to make the accuracy of control and the reduction of manufacturing cost of the actuator compatible with each other.

(C-8) The first rotary encoder 106 is provided between the second rotary encoder 108 and the stator 66 in an axial direction D2 parallel to the input rotational axis RA1. Accordingly, it is possible to easily arrange the first rotary encoder 106 and the second rotary encoder 108 at respective positions adjacent to the rotor 68 and the output shaft 70.

(C-9) The control substrate 110 is provided between the first rotary encoder 106 and the second rotary encoder 108 in an axial direction D2 parallel to the input rotational axis RA1. Accordingly, it is possible to arrange the first rotary encoder 106 and the second rotary encoder 108 at positions adjacent to the control substrate 110, allowing the first rotary encoder 106 and the second rotary encoder 108 to be easily electrically connected to the control substrate 110.

(C-10) Since the servo controller 142 is provided in the internal space S1, it is possible to simplify an external controller (e.g., the robot control device 190) to control the actuator.

(C-11) The braking structure 98 is provided between the first rotary encoder 106 and the stator 66 in an axial direction D2 parallel to the input rotational axis RA1. Accordingly, it is possible to efficiently arrange the braking structure 98 in the internal space S1 of the housing 64.

(D-1) The first rotary encoder 106 is configured to sense the first rotational position of the rotor 68 relative to the stator 66. The second rotary encoder 108 is configured to sense the second rotational position of the output shaft 70 relative to the stator 66. Accordingly, it is possible to calculate a difference between the first rotational position of the rotor 68 and the second rotational position of the output shaft 70, improving accuracy of control of the actuator.

(D-2) Since the output shaft 70 extends through the through-hole 82 of the rotor 68, it is possible to utilize a space defined in the through-hole 82 of the rotor 68, allowing the actuator to be more compact.

(D-3) The speed reducer 72 is configured to couple the first rotor end 68*a* to the first output end 70*a* to reduce the rotational speed of the output shaft 70 relative to the rotational speed of the rotor 68. Accordingly, it is possible to efficiently arrange the speed reducer 72 in the internal space S1 of the housing 64.

(D-4) The first rotary encoder 106 is closer to the second rotor end 68*b* than to the first rotor end 68*a*. The second rotary encoder 108 is closer to the second output end 70*b* than to the first output end 70*a*. Accordingly, it is possible to stabilize rotation of the rotor 68.

(D-5) The first rotary encoder 106 is configured to sense the absolute rotational position of the rotor 68 relative to the stator 66. The second rotary encoder 108 is configured to sense the relative rotational position of the output shaft 70 relative to the stator 66. Accordingly, it is possible to further improve the accuracy of control of the actuator.

(D-6) The first rotary encoder 106 includes the magnetic rotary encoder. The second rotary encoder 108 includes the optical rotary encoder. Accordingly, it is possible to make the accuracy of control and the reduction of manufacturing cost of the actuator compatible with each other.

(D-7) The first rotary encoder 106 is provided between the second rotary encoder 108 and the stator 66 in the axial direction D2 parallel to the input rotational axis RA1. Accordingly, it is possible to easily arrange the first rotary encoder 106 and the second rotary encoder 108 at respective positions adjacent to the rotor 68 and the output shaft 70.

(D-8) The control substrate 110 is provided between the first rotary encoder 106 and the second rotary encoder 108 in the axial direction D2 parallel to the input rotational axis RA1. Accordingly, it is possible to arrange the first rotary encoder 106 and the second rotary encoder 108 at positions adjacent to the control substrate 110, allowing the first rotary encoder 106 and the second rotary encoder 108 to be easily electrically connected to the control substrate 110.

(D-9) Since the servo controller 142 is configured to control rotation of the rotor 68 based on the first rotational position and the second rotational position, it is possible to simplify an external controller (e.g., the robot control device 190) to control the actuator.

(D-10) Since the braking structure 98 is provided between the first rotary encoder 106 and the stator 66 in the axial direction D2 parallel to the input rotational axis RA1, it is possible to efficiently arrange the braking structure 98.

(E-1) Since the converter 144 is provided in the internal space S1, it is possible to simplify an external controller (e.g., the robot control device 190) to control the actuator.

(F-1) In the braking structure 98, the transmitting part 130 is configured to transmit the actuating force F22 from the braking actuator 128 to the braking member 126 to move the braking member 126 between the braking position P31 and the releasing position P32. Accordingly, it is possible to arrange the brake actuator away from the braking member 126 because of the transmitting part 130, improving flexibility of the design of the actuator.

(F-2) The braking member 126 includes the first sliding surface 126*a* inclined relative to the axial direction D2. The transmitting part 130 includes the second sliding surface 130*a* inclined relative to the axial direction D2. The first sliding surface 126*a* is slidable with the second sliding surface 130*a* to move the braking member 126 between the braking position P31 and the releasing position P32. Accordingly, it is possible to differ a direction of motion of the transmitting part 130 from a direction of motion of the braking member 126. This can effectively improve flexibility of the design of the actuator.

(F-3) The biasing element 138 is configured to bias the braking member 126 toward the braking position P31 relative to the brake base 122. Accordingly, it is possible to apply the braking force F21 to the rotor 68 in a state where the transmitting part 130 does not transmit the actuating force F22 from the braking actuator 128 to the braking member 126.

(F-4) Since the transmitting part 130 is pivotable relative to the brake base 122 about a brake pivot axis PA7, it is possible to change the actuating force F22 applied from the braking actuator 128 in accordance with a position the brake pivot axis PA7.

(F-5) Since the brake pivot axis PA7 is substantially parallel to the input rotational axis RA1, the transmitting part 130 moves on a plane substantially perpendicular to the input rotational axis RA1. Accordingly, it is possible to shorten an axial length of the braking structure 98, allowing the actuator to be compact.

(F-6) Since the braking actuator 128 is farther from the brake pivot axis PA7 than the braking member 126, it is possible to increase the actuating force F22 applied from the braking actuator 128 by using principle of leverage.

(F-7) Since the rotor 68 is provided between the braking member 126 and the braking actuator 128, it is possible to make a distance between the braking actuator 128 and the brake pivot axis PA7. This can further increase the actuating force F22 applied from the braking actuator 128.

(F-8) Since the electromagnetic actuator is configured to convert electrical power to the actuating force F22, it is possible to simplify the braking actuator 128, reducing manufacturing cost of the actuator.

(G-1) Since the braking controller 140 is provided in the internal space S1, it is possible to simplify an external controller (e.g., the robot control device 190) to control the actuator.

(H-1) The second coupling part 152 is movable relative to the first coupling part 148 between the securing position P51 and the detachable position P52. Accordingly, it is possible to simplify the coupling structure of the first actuating device and the second actuating device, allowing the robot arm 12 to be compact.

(H-2) The second coupling part 152 is rotatable relative to the first coupling part 148 about a coupling axis A2 between the securing position P51 and the detachable position P52. Accordingly, it is possible to attach and detach the second coupling part 152 to and from the first coupling part 148 by rotating the second coupling part 152 relative to the first coupling part 148.

(H-3) The second receiving surface 152c of the second coupling part 152 is contactable with the first receiving surface 148c of the first coupling part 148. Accordingly, it is possible to position the second coupling part 152 relative to the first coupling part 148 in the axial direction D2 in a state where the second receiving surface 152c is in contact with the first receiving surface 148c.

(H-4) The first protruding portion 148b is spaced apart from the first receiving surface 148c in the axial direction D2 in the securing state. The second coupling part 152 is provided between the first protruding portion 148b and the first receiving surface 148c in the axial direction D2 in the securing state. Accordingly, it is possible to easily rotate the second coupling part 152 relative to the first coupling part 148.

(H-5) The positioning structure 160 includes a spacer 162 configured to be fitted between the first protruding portion 148b and the second protruding portion 152b in the securing state. Accordingly, it is possible to push the second coupling part 152 against the first coupling part 148 by the spacer 162, allowing the first coupling part 148 and the second coupling part 152 to be secured to each other.

(H-6) The first protruding portion 148b and the second protruding portion 152b are spaced apart from each other in the axial direction D2 to define an axial distance L11 between the first protruding portion 148b and the second protruding portion 152b in the axial direction D2. The axial distance L11 increases from the first outer peripheral surface 148a toward the second inner peripheral surface 152a. Accordingly, it is possible to move the second coupling part 152 away from the first coupling part 148 in the axial direction D2 by fitting the spacer 162 between the first protruding portion 148b and the second protruding portion 152b.

(H-7) At least one of the first securing surface 148d and the second securing surface 152d is inclined relative to the axial direction D2 to increase the axial distance L11 from the first outer peripheral surface 148a toward the second inner peripheral surface 152a. Accordingly, it is possible to move the second coupling part 152 away from the first coupling part 148 in the axial direction D2 by fitting the spacer 162 between the first securing surface 148d and the second securing surface 152d.

(H-8) The positioning structure 160 includes an adjustment member 164 configured to radially move the spacer 162 relative to the first coupling part 148 and the second coupling part 152. Accordingly, it is possible to adjust a radial position of the spacer 162 relative to the first coupling part 148 and the second coupling part 152.

(H-9) Since the adjustment member 164 is provided radially outward of the spacer 162, it is possible to push radially inwardly the spacer 162, allowing the radial position of the spacer 162 to be easily adjusted.

(H-10) The second coupling part 152 includes the threaded hole. The adjustment member 164 includes the external threads engaged with the threaded hole, and the contact surface contactable with the spacer 162. Accordingly, it is possible to easily adjust the radial position of the spacer 162 by rotating the adjustment member 164 relative to the second coupling part 152.

(I-1) Since the electrical cable 146 is configured to be electrically connect the actuators to each other in series, it is possible to simplify the configuration of the robot arm 12.

(I-2) Since the electrical cable 146 is configured to be electrically connect the converter 144s of the actuators to each other in series, it is possible to simplify an external controller (e.g., the robot control device 190) to control the actuators.

(I-3) Since the converter 144 is provided in the internal space S1, it is possible to further simplify an external controller (e.g., the robot control device 190) to control the actuators.

(I-4) The converter 144 is configured to convert one of a direct current and a single-phase alternating current to a three-phase alternating current. Since the direct current or the single-phase alternating current is supplied from a power supply to the converter 144s via the electrical cable 146, it is possible to reduce a total number of lines provided in the electrical cable 146 comparing with a case where the three-phase alternating current is supplied to the converter 144s via the electrical cable 146. This allows the configuration of the robot arm 12 to be simple.

(J-1) Since the output shaft 70 is secured to the first arm end 168a and the cover 170, it is possible to simplify the structure of the robot arm 12.

(J-2) Since the cover 170 is provided between the first arm end 168a and the output shaft 70, it is possible to secure the first arm 16 to the output shaft 70 along with the cover 170.

(J-3) The first cover body 180 is secured to the output shaft 70 together with the first arm end 168a. The second cover body 182 is detachably attached to the first cover body 180 as a separate member from the first cover body 180. Accordingly, it is possible to access an inside of the arm body 168 to secure the arm body 168 and the first cover body 180 to the output shaft 70 in a state where the second cover body 182 is detached from the first cover body 180. This allows a fastener to be covered by the second cover body 182, improving the appearance of the robot arm 12.

(K-1) The coupling member 216 is configured to couple the housing top 214 to the housing base 210 to hold the housing body 212 between the housing top 214 and the housing base 210. Accordingly, it is possible to reduce a total number of a threaded hole in at least one of the housing base 210, the housing body 212, and the housing top 214, or to eliminate such a threaded hole from at least one of the housing base 210, the housing body 212, and the housing top 214. This can reduce the manufacturing cost of the controller housing structure 208.

(K-2) The first through-hole 218 is free of an internal thread. The second through-hole 220 is free of an internal thread. Accordingly, it is possible to reduce the manufacturing cost of the controller housing structure 208.

(K-3) The coupling rod 221 includes the first external threads 221a and the second external threads 221b. The first external threads 221a are engaged with the first threaded hole 222a. The second external threads 221b are engaged with the second threaded hole 224a. The housing base 210 and the housing top 214 are provided between the first securing element 222 and the second securing element 224. Accordingly, it is possible to couple the housing top 214 to the housing base 210 with a simple structure.

(K-4) Since the coupling rod 221 is provided in the inner space, it is possible to simplify the appearance of the controller housing structure 208.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the tams "have", "include" and their derivatives.

The term "configured" as used herein to describe a component, section or part of a device includes hardware and/or software that is constructed and/or programmed to carry out the desired function. The desired function can be carried out by hardware, software, or a combination of hardware and software.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. An actuator comprising:
a housing including an internal space;
a stator provided in the internal space;
a rotor rotatable relative to the stator about an input rotational axis and provided in the internal space;
a braking structure provided in the internal space to apply a braking force to the rotor, the braking structure including a braking member movable substantially in an axial direction parallel to the rotational axis to apply the braking force, the braking member having a first sliding surface;
an output shaft rotatable relative to the stator and the rotor about an output rotational axis, the output shaft being provided in the internal space;
a speed reducer configured to couple the rotor to the output shaft to reduce a rotational speed of the output shaft relative to a rotational speed of the rotor, the speed reducer being provided in the internal space; and
a biasing element configured to bias the braking member to apply the braking force,
wherein the braking structure further includes a braking actuator configured to move a second sliding surface inclined relative to the axial direction into contact with the first sliding surface to move the braking member substantially in the axial direction to release the braking force.

2. The actuator according to claim 1, wherein
the output rotational axis substantially coincides with the input rotational axis.

3. The actuator according to claim 2, wherein
the rotor includes a through-hole extending along the input rotational axis, and
the output shaft extends through the through-hole.

4. The actuator according to claim 3, wherein
the rotor includes a first rotor end and a second rotor end opposite to the first rotor end in an axial direction parallel to the input rotational axis,
the output shaft includes a first output end and a second output end opposite to the first output end in the axial direction, and
the speed reducer is configured to couple the first rotor end to the first output end to reduce the rotational speed of the output shaft relative to the rotational speed of the rotor.

5. The actuator according to claim 1, further comprising:
a converter provided in the internal space and electrically connected to the stator, the converter being configured to convert electric power supplied from a power supply into converted electric power to be supplied to the stator.

6. The actuator according to claim 1, wherein
the braking structure further comprises:
a brake base;
a brake rotor coupled to the rotor to be rotatable around a rotational axis together with the rotor; and
a transmitting part,
wherein the braking member is movable relative to the brake base to be spaced apart from the brake rotor and to be in contact with the brake rotor to apply the braking force to the brake rotor substantially in the axial direction parallel to the rotational axis,
wherein the braking actuator is provided on the brake base to generate an actuating force; and
wherein the transmitting part is configured to transmit the actuating force from the braking actuator to the braking member to move the braking member.

7. The actuator according to claim 6,
wherein the braking actuator is configured to move the transmitting part relative to the brake base in a movement direction different from the axial direction,
wherein the transmitting part includes the second sliding surface inclined relative to the axial direction, and
wherein the first sliding surface is slidable with the second sliding surface to move the braking member substantially in the axial direction.

* * * * *